(12) United States Patent
Bannai et al.

(10) Patent No.: US 11,815,635 B2
(45) Date of Patent: Nov. 14, 2023

(54) RADIOGRAPHIC APPARATUS AND RADIOGRAPHIC SYSTEM

(71) Applicant: CANON KABUSHIKI KAISHA, Tokyo (JP)

(72) Inventors: Ryunosuke Bannai, Kanagawa (JP); Hideyuki Okada, Saitama (JP); Kentaro Fujiyoshi, Irvine, CA (US); Yoshiaki Serizawa, Kanagawa (JP); Shuichi Fujita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 17/736,931

(22) Filed: May 4, 2022

(65) Prior Publication Data

US 2022/0365232 A1 Nov. 17, 2022

(30) Foreign Application Priority Data

May 11, 2021 (JP) .................................. 2021-080611

(51) Int. Cl.
  *G01T 1/24* (2006.01)
  *H04N 5/32* (2023.01)
  *H04N 25/75* (2023.01)

(52) U.S. Cl.
  CPC .............. *G01T 1/247* (2013.01); *H04N 5/32* (2013.01); *H04N 25/75* (2023.01)

(58) Field of Classification Search
  None
  See application file for complete search history.

(56) References Cited

U.S. PATENT DOCUMENTS

| | | | |
|---|---|---|---|
| 7,012,260 B2* | 3/2006 | Endo | H04N 5/32 250/370.09 |
| 2014/0241501 A1* | 8/2014 | Sato | G01T 1/17 250/394 |
| 2016/0370225 A1* | 12/2016 | Iwashita | H04N 5/32 |
| 2018/0216993 A1* | 8/2018 | Okada | H04N 25/709 |
| 2019/0045612 A1* | 2/2019 | Tamura | A61B 6/469 |

FOREIGN PATENT DOCUMENTS

JP 2014168203 A 9/2014

* cited by examiner

*Primary Examiner* — Edwin C Gunberg
(74) *Attorney, Agent, or Firm* — Canon U.S.A., Inc., IP Division

(57) ABSTRACT

A radiographic apparatus includes a plurality of pixel groups, bias sources, and a sensing unit, wherein each pixel group includes a pixel including a conversion element for converting radiation into a charge. Each bias source supplies a bias potential to the conversion element of a pixel via a bias line. The sensing unit samples a first signal value indicating a current flowing through a first bias line connected to a first pixel group including a pixel of which a switch element is turned on and a second signal value indicating a current flowing through a second bias line connected to a second pixel group where the switch element is off at timings overlapping at least in part and determines presence or absence of radiation irradiation based on the first signal value and the second signal value. The first and second bias lines have substantially same time constants.

18 Claims, 15 Drawing Sheets

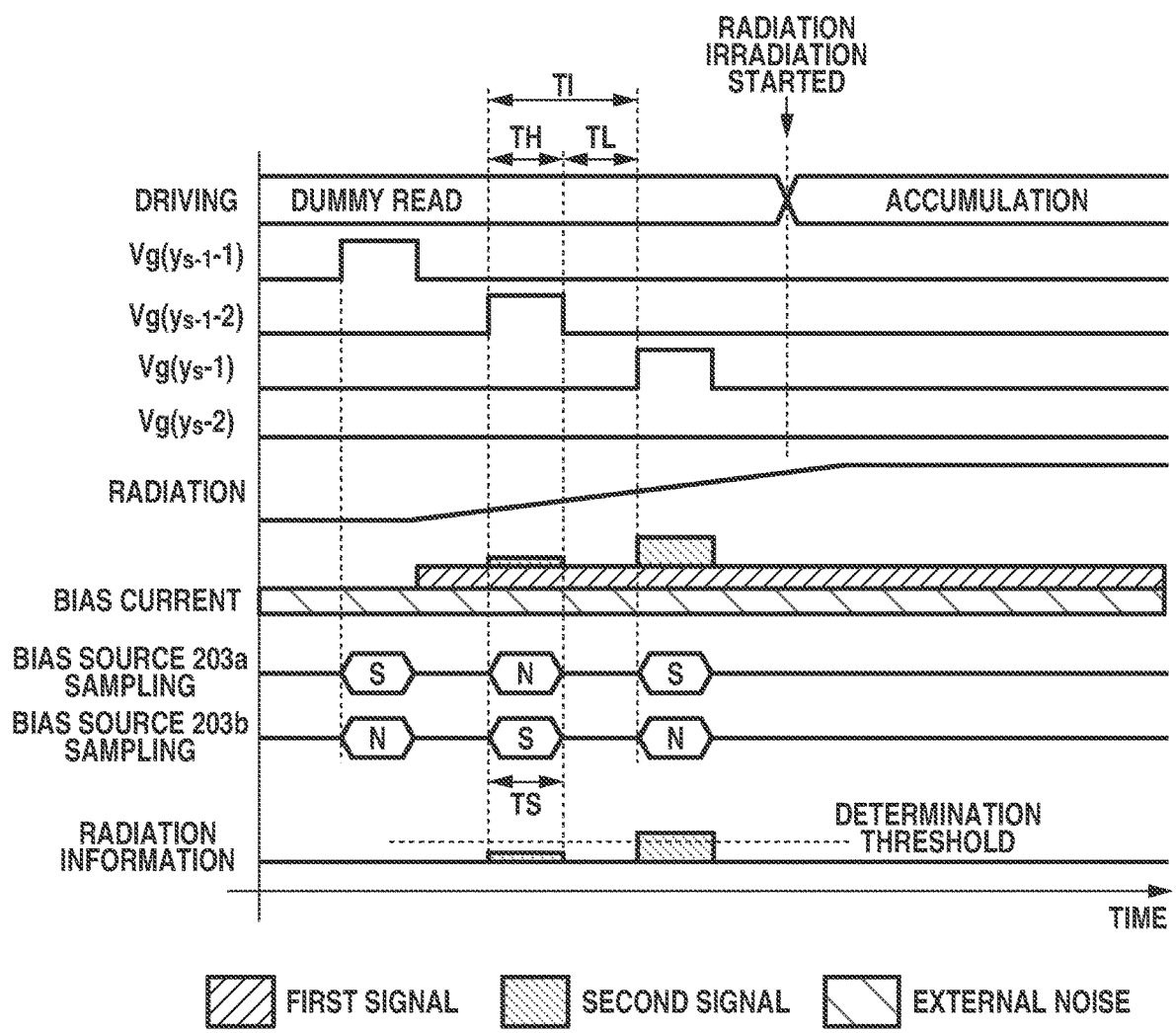

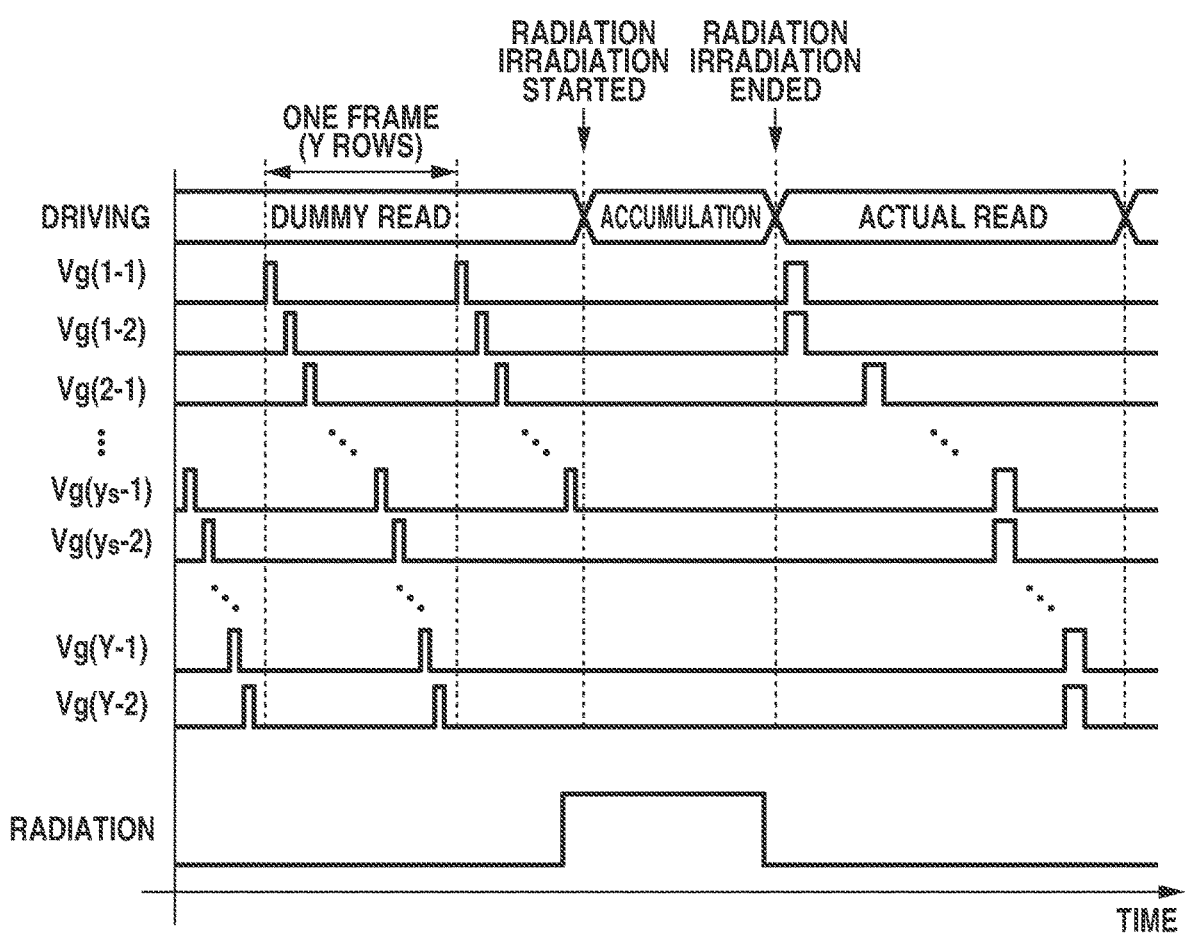

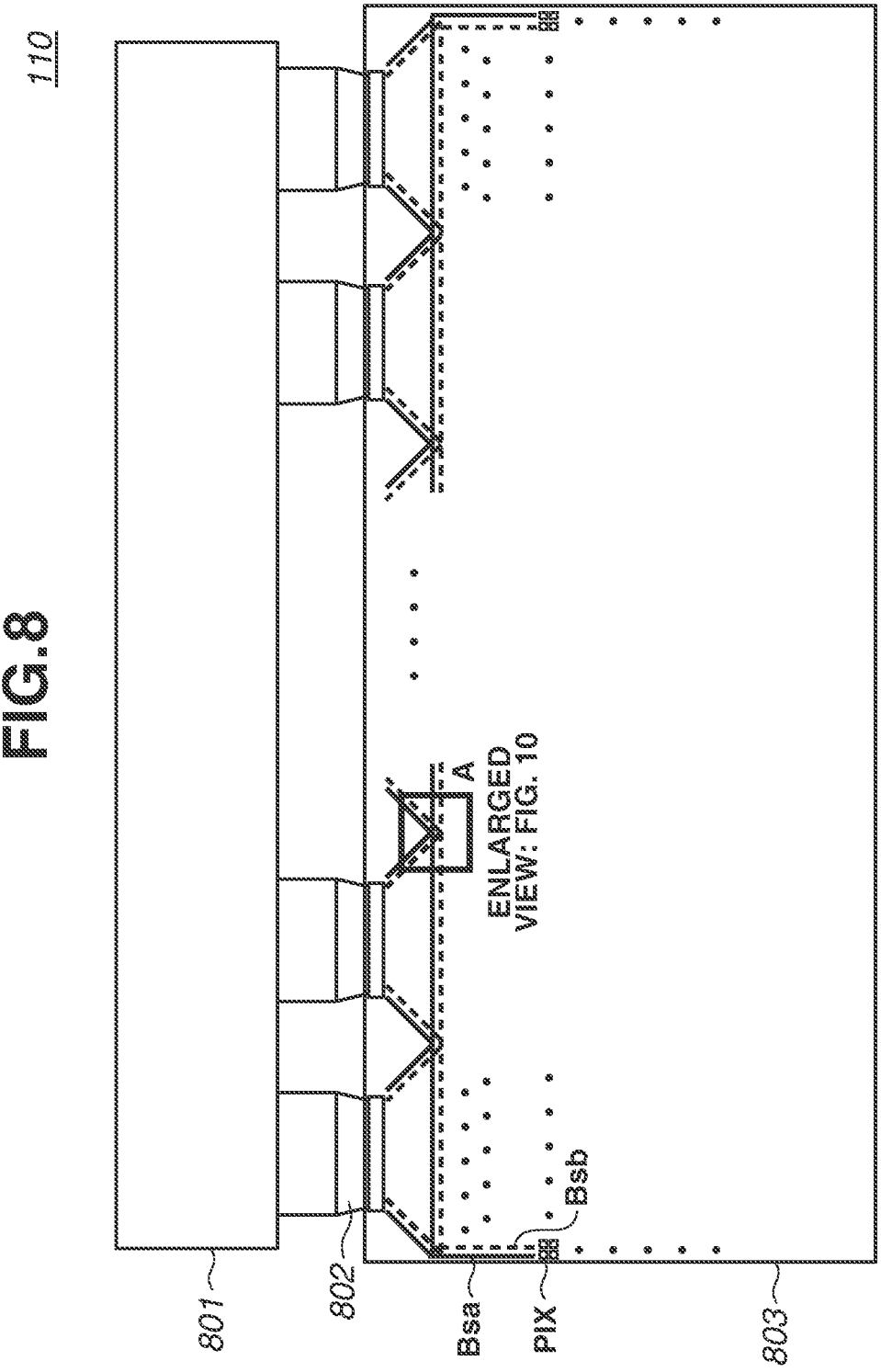

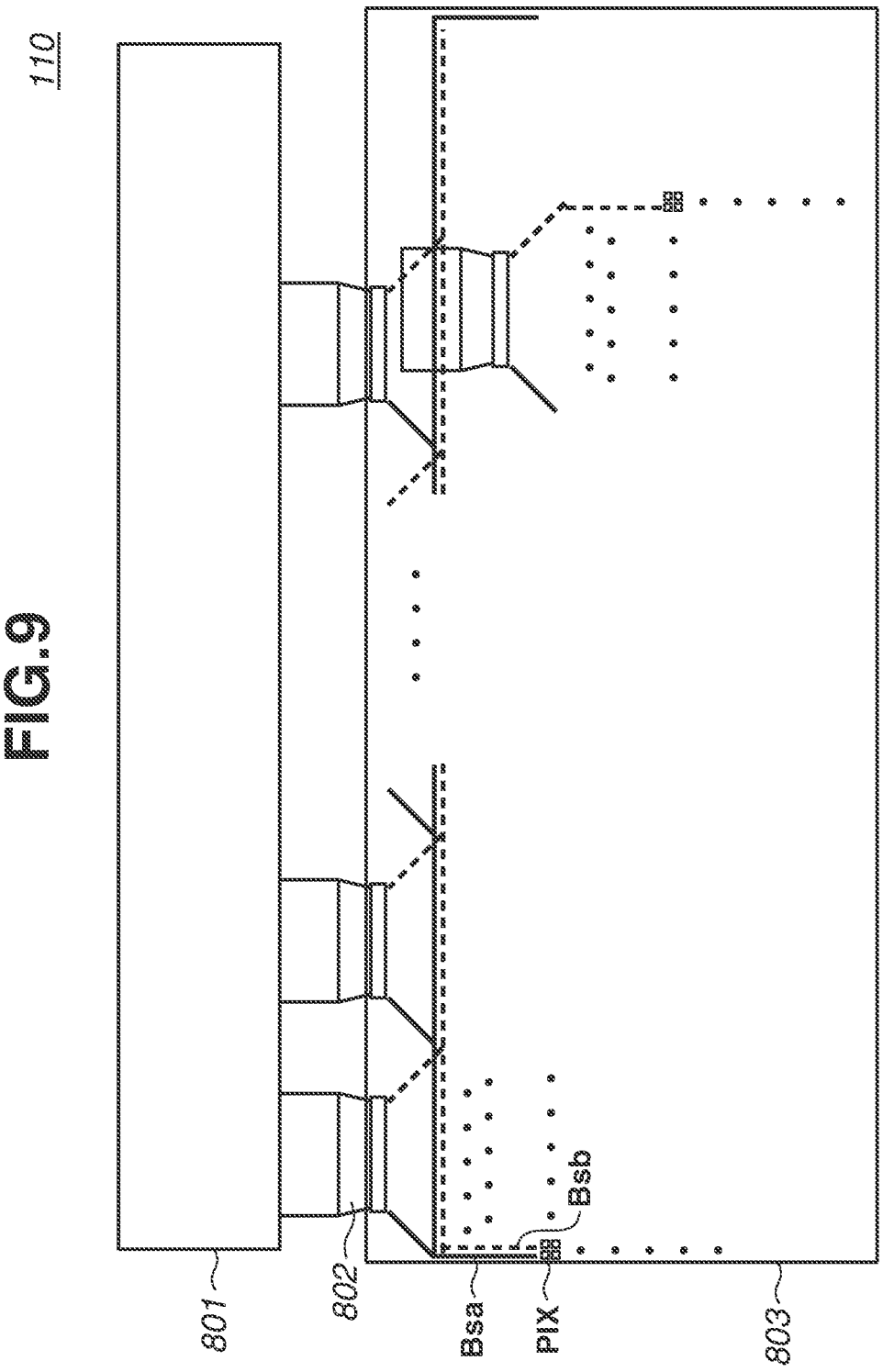

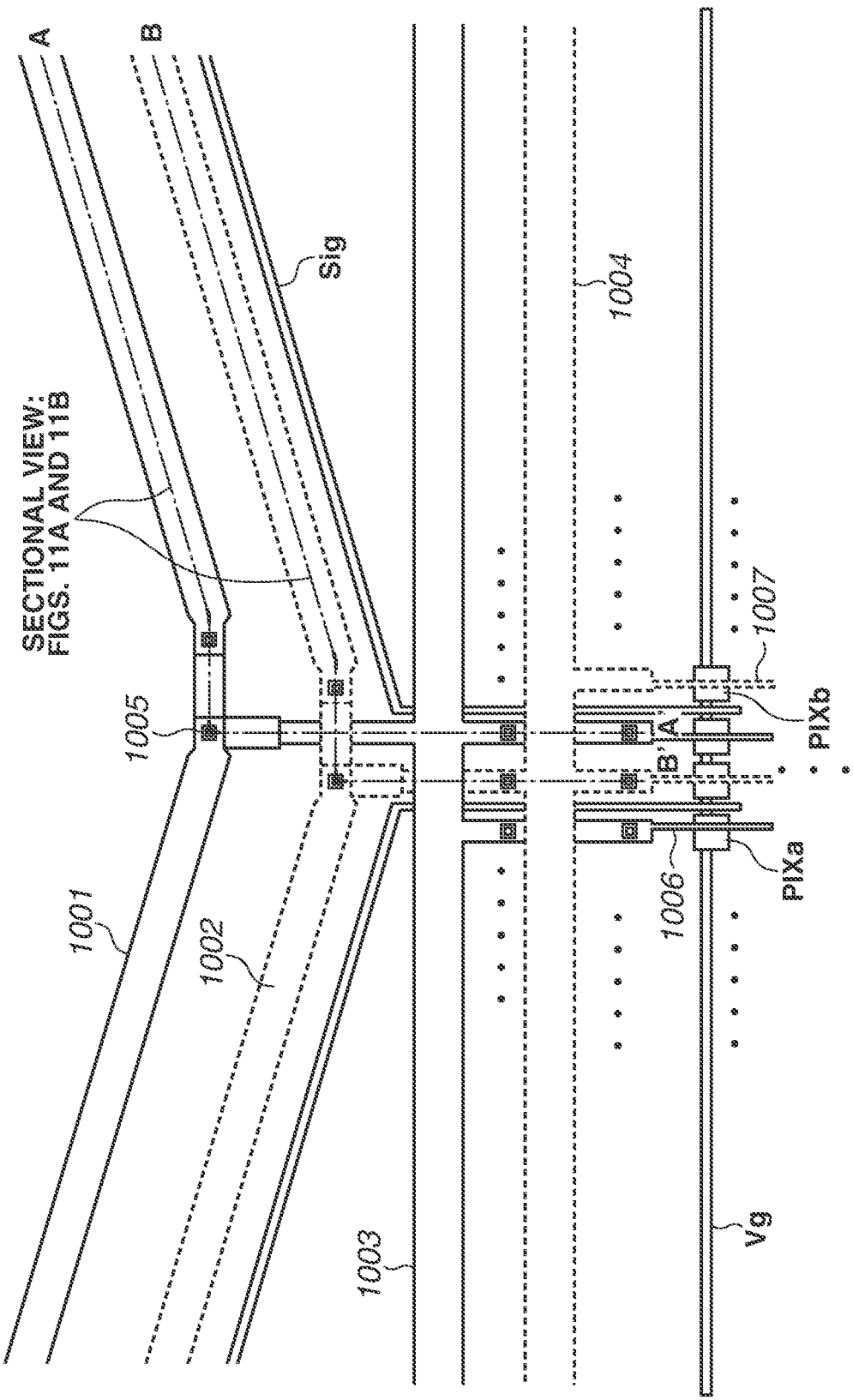

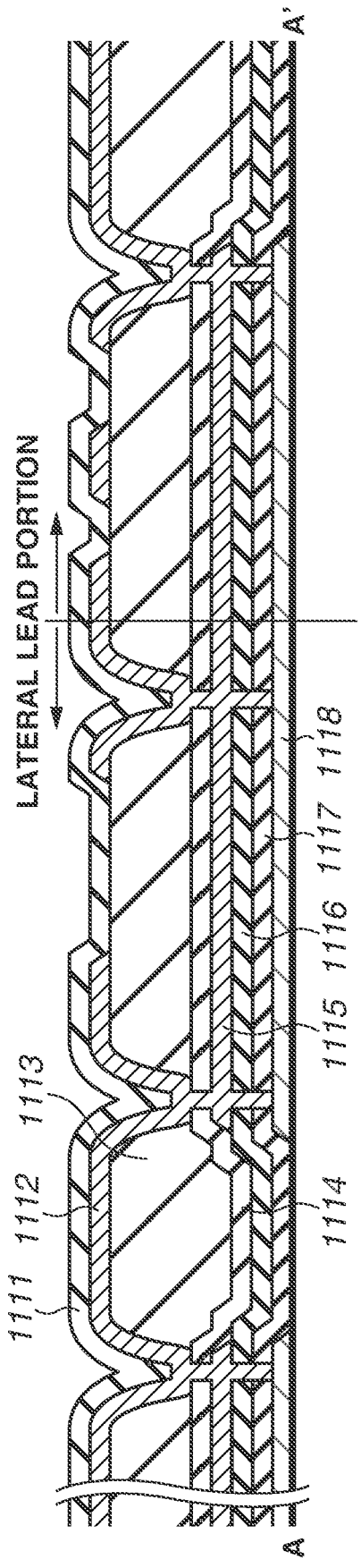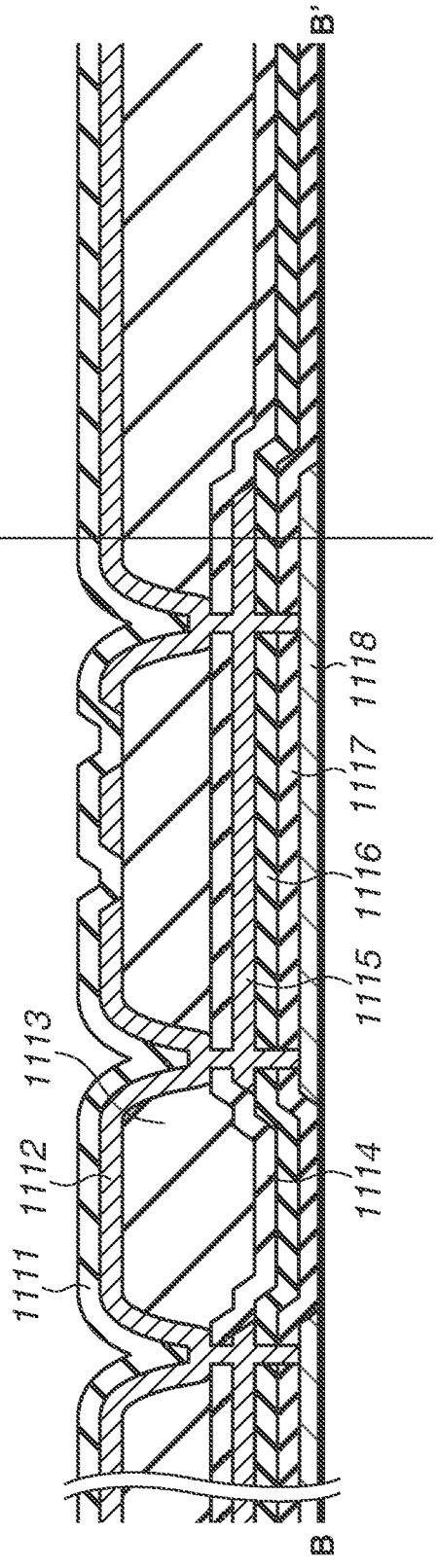

RADIOGRAPHIC APPARATUS AND RADIOGRAPHIC SYSTEM

BACKGROUND

Field of the Disclosure

The present disclosure relates to a radiographic apparatus and a radiographic system.

Description of the Related Art

Radiographic apparatuses using a flat panel detector (FPD) formed of semiconductor materials are widely used in medical image diagnosis and nondestructive inspection. Japanese Patent Application Laid-Open No. 2014-168203 discusses a radiographic apparatus that senses the presence or absence of radiation irradiation for the sake of synchronization with a radiation generation apparatus, using the flow of a current (bias current) through a bias line for supplying a bias potential to pixels when the radiographic apparatus is irradiated with radiation. The radiographic apparatus discussed in Japanese Patent Application Laid-Open No. 2014-168203 obtains the bias current that flows when switch elements are conductive and the bias current that flows when the switch elements are not conductive from the same pixels as an effective value and a noise value, respectively, and detects the presence or absence of radiation irradiation based on the effective value and the noise value.

Japanese Patent Application Laid-Open No. 2014-168203 discusses reduction of effects of noise by detecting the presence or absence of radiation irradiation based on the effective value and the noise value. However, the technique discussed in Japanese Patent Application Laid-Open No. 2014-168203 still needs some more improvement in sensing the presence or absence of radiation irradiation with high accuracy.

SUMMARY

The present disclosure is directed to providing a technique advantageous in sensing the presence or absence of radiation irradiation with higher accuracy.

According to an aspect of the present invention, a radiographic apparatus includes a plurality of pixel groups and a plurality of bias sources disposed so that the pixel groups and the bias sources correspond to each other on a one-to-one basis, a driving circuit, and a sensing unit. Each of the plurality of pixel groups includes a pixel including a conversion element configured to convert radiation into a charge and a switch element configured to connect the conversion element to a signal line. Each of the plurality of bias sources is configured to supply a bias potential to the conversion element of the pixel in the corresponding pixel group via at least one of a plurality of electrically independent bias lines. The driving circuit is configured to control the switch elements of the pixels. The sensing unit is configured to sample a first signal value and a second signal value at timings overlapping at least in part, wherein the first signal value indicates a current flowing through a first bias line, among the plurality of bias lines, connected to a first pixel group including a pixel of which the switch element is turned on by the driving circuit among the plurality of pixel groups, and the second signal value indicates a current flowing through a second bias line, among the plurality of bias lines, connected to a second pixel group where the switch element is off among the plurality of pixel groups. The sensing unit is further configured to determine presence or absence of radiation irradiation based on the first signal value and the second signal value. The first and second bias lines have substantially same time constants.

Further features of the present invention will become apparent from the following description of exemplary embodiments with reference to the attached drawings.

BRIEF DESCRIPTION OF THE DRAWINGS

FIG. 6 is a detailed diagram illustrating the driving timing when the radiographic apparatus illustrated in FIG. 1 detects radiation.

FIG. 7 is a schematic diagram illustrating the driving timing of the radiographic apparatus illustrated in FIG. 1.

FIG. 8 is a schematic diagram illustrating a configuration example of the radiographic apparatus illustrated in FIG. 1.

FIG. 9 is a schematic configuration diagram illustrating a comparative configuration example of the radiographic apparatus illustrated in FIG. 1.

FIG. 10 is a schematic diagram illustrating a configuration example of bias lines of the radiographic apparatus illustrated in FIG. 8.

FIGS. 11A and 11B are schematic sectional views illustrating an example of a layer configuration of the bias lines illustrated in FIG. 10.

DESCRIPTION OF THE EMBODIMENTS

Figure 1:
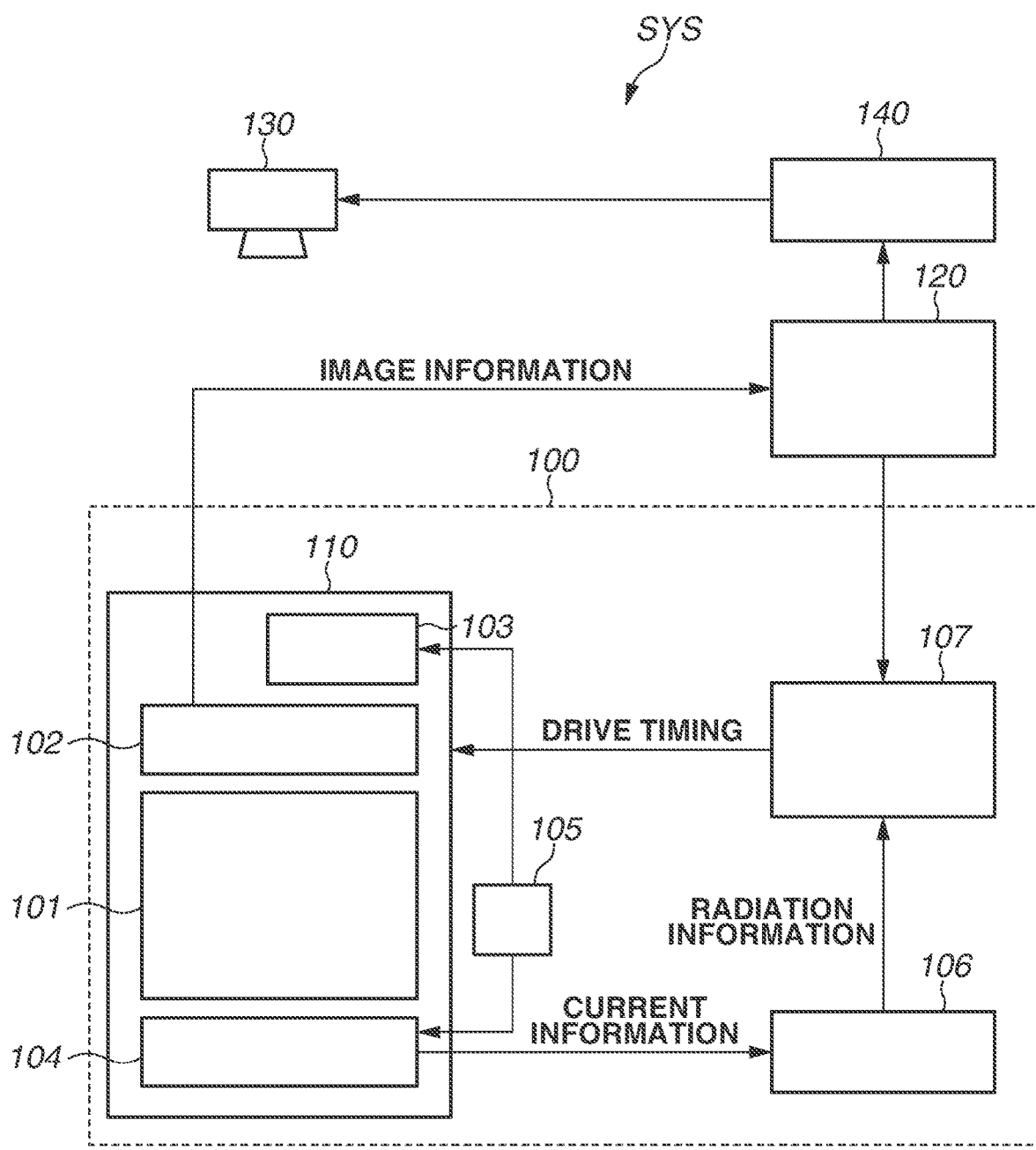
FIG. 1 is a diagram illustrating a configuration example of a radiographic system using a radiographic apparatus according to an exemplary embodiment of the present invention.

Exemplary embodiments will be described in detail below with reference to the attached drawings. The following exemplary embodiments are not intended to limit the invention set forth in the claims. While the exemplary embodiments are described to include a plurality of features, all the plurality of features is not necessarily indispensable to the invention, and the features may be combined as appropriate. In the attached drawings, the same or similar components are denoted by the same reference numerals, and a redundant description thereof will be omitted. As employed in the exemplary embodiments, radiation can include not only beams that are formed by particles (including photons) emitted by radioactive decay, such as $\alpha$ rays, $\beta$ rays, and $\gamma$ rays, but also beams having equivalent or higher energy, such as X-rays, particle beams, and cosmic rays.

The exemplary embodiments of the present invention have been achieved to address new issues found by the inventors through the inventors' detailed study. According to the inventor's study, it is found that a current can flow through a bias line due to reasons other than radiation irradiation, such as application of an impact to the radiographic apparatus. If a large current flows due to noise, radiation irradiation can be erroneously sensed despite the absence of radiation irradiation. Japanese Patent Application Laid-Open No. 2014-168203 discusses reduction of effects of noise by detecting the presence or absence of radiation irradiation based on the effective value and the noise value. However, noise having high frequency components occurring when the radiographic apparatus undergoes an impact may be unable to be reduced. The present exemplary embodiment is directed to providing a technique advantageous in sensing the presence or absence of radiation irradiation with high accuracy.

A radiographic apparatus according to a first exemplary embodiment of the present invention will be described with reference to FIGS. 1 to 10. FIG. 1 is a diagram illustrating a configuration example of a radiographic system SYS using a radiographic apparatus 100 according to the present exemplary embodiment. The radiographic system SYS according to the present exemplary embodiment can include the radiographic apparatus 100, a control computer 120, a radiation generation apparatus 130, and a radiation control apparatus 140.

The radiation generation apparatus 130 exposes the radiographic apparatus 100 to radiation based on control from the radiation control apparatus 140. The control computer 120 can control the entire radiographic system SYS. The control computer 120 also obtains a radiographic image formed by the radiation from the radiation generation apparatus 130 with which the radiographic apparatus 100 is irradiated via an object.

The radiographic apparatus 100 includes a detection unit 110, a power supply unit 105, a sensing unit 106, and a control unit 107. The detection unit 110 includes a pixel unit 101, a reading circuit 102, a reference power supply 103, and a bias power supply unit 104. The pixel unit 101 includes a two-dimensional array of a plurality of pixels for detecting radiation. The reading circuit 102 reads electric charge information from the pixel unit 101. The reference power supply 103 supplies a reference voltage to the reading circuit 102. The bias power supply unit 104 supplies bias potentials to conversion elements of the pixels arranged in the pixel unit 101. The power supply unit 105 supplies power to various power supplies including the reference power supply 103 and the bias power supply unit 104. The sensing unit 106 obtains current information from the bias power supply unit 104. More specifically, the sensing unit 106 obtains, from the bias power supply unit 104, information about currents flowing through bias lines for the bias power supply unit 104 to supply the bias potentials to the pixels in the pixel unit 101. The sensing unit 106 performs arithmetic operations on the current information output from the bias power supply unit 104, and outputs radiation information including temporal changes in the strength of the radiation incident on the pixel unit 101. A digital signal processing circuit such as a field-programmable gate array (FPGA), a digital signal processor (DSP), and a processor can be used as the sensing unit 106. The sensing unit 106 may include an analog circuit such as a sample-and-hold circuit and an operational amplifier. While in the configuration illustrated in FIG. 1 the sensing unit 106 is included in the radiographic apparatus 100, the control computer 120 may have the function of the sensing unit 106. In such a case, the radiographic apparatus 100 illustrated in FIG. 1 and the portion of the control computer 120 functioning as the sensing unit 106 can be referred to collectively as the "radiographic apparatus" of the present exemplary embodiment. The detection unit 110 will be described in detail below with reference to FIG. 2. The control unit 107 controls the entire radiographic apparatus 100, including driving of the radiographic apparatus 100. The control unit 107 controls the detection unit 110 by using a driving method specified by the control computer 120 based on user settings. The driving method of the detection unit 110 may be changed using the radiation information output from the sensing unit 106.

Figure 2:
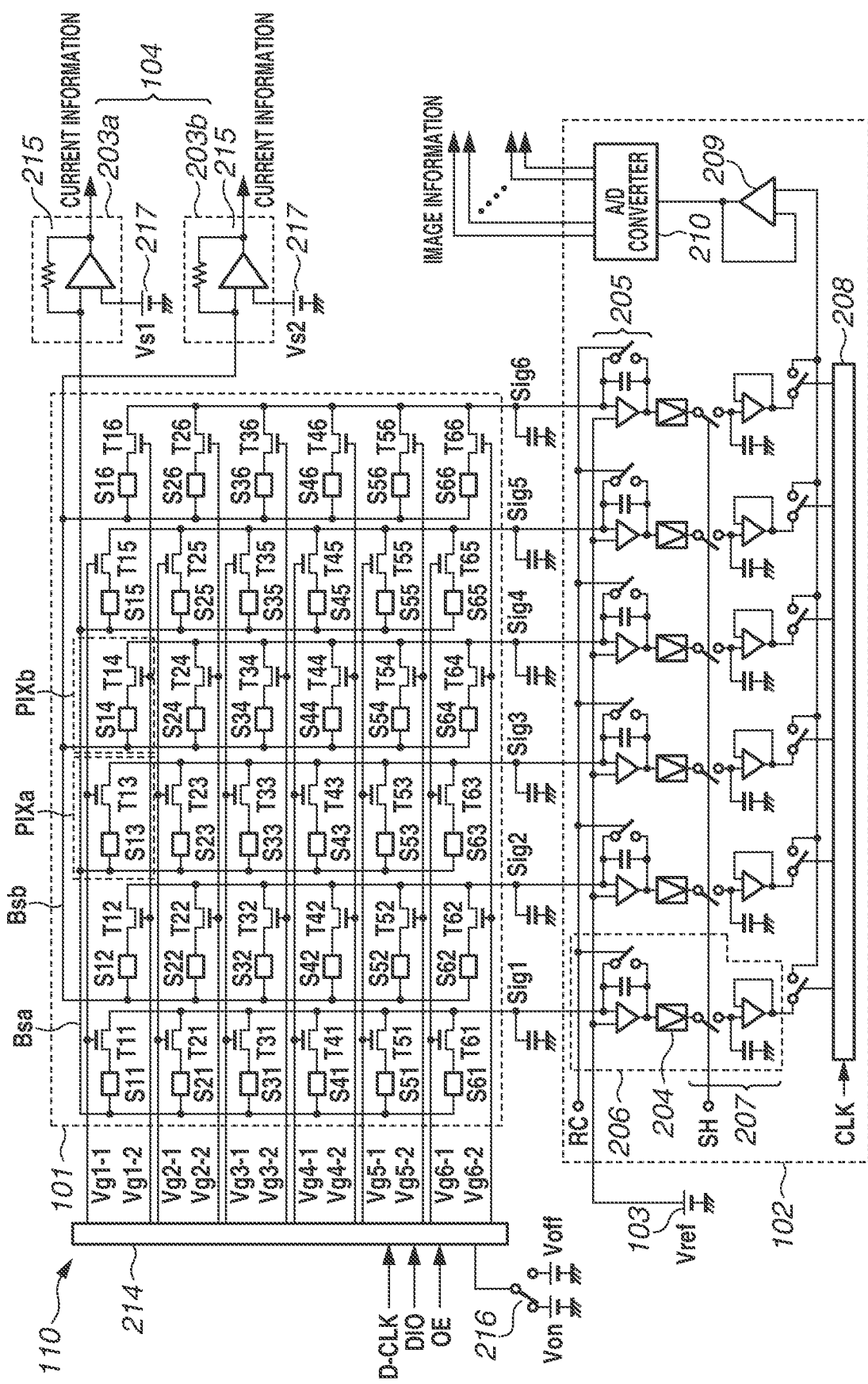
FIG. 2 is a diagram illustrating a configuration example of the radiographic apparatus illustrated in FIG. 1.

FIG. 2 is an equivalent circuit diagram illustrating a configuration example of the detection unit 110 of the radiographic apparatus 100. For ease of description, FIG. 2 illustrates a pixel unit 101 including six rows by six columns of pixels PIX. However, the pixel unit 101 of the actual radiographic apparatus 100 can include more pixels. For example, a 17-inch radiographic apparatus 100 can include approximately 2800 rows by 2800 columns of pixels PIX.

The pixel unit 101 is a two-dimensional detector including the plurality of pixels PIX arranged in a matrix. The pixels PIX include conversion elements S (S11 to S66) for converting radiation into an electric charge, and switch elements T (T11 to T66) for connecting the conversion elements S to signal lines Sig to output electrical signals corresponding to the electric charge. In the present exemplary embodiment, the conversion elements S are indirect conversion elements each including a photoelectric conversion element and a wavelength converter for converting radiation into light of a wavelength band detectable by the photoelectric conversion element. The wavelength converter is located on the radiation incident side of the photoelectric conversion element. Metal-insulator-semiconductor (MIS) photodiodes made mainly of a semiconductor material such as amorphous silicon and disposed on an insulating substrate such as a glass substrate may be used as the photoelectric conversion elements for converting light into an electric charge. Not only MIS photodiodes but positive-intrinsic-negative (PIN) photodiodes may also be used as the photoelectric conversion elements, for example. Direct conversion elements that directly convert radiation into an electric charge may be used as the conversion elements S. Furthermore, transistors having a control terminal and two main terminals may be used for the switch elements T. In the present exemplary embodiment, thin-film transistors (TFTs) are used as the switch elements T.

One of the electrodes of the conversion element S is electrically connected to one of the two main terminals of the switch element T. The other electrode of the conversion element S is electrically connected to a bias source 203 of the bias power supply unit 104 via a bias line Bs. The control terminals of a plurality of switch elements T arranged in a row direction (lateral direction in the diagram), for example, the switch elements T11, T13 and T15 are electrically connected to a first-row drive line Vg1-1 in common. A drive signal for controlling the conductive states of the switch elements T is supplied from a driving circuit 214 via the drive line Vg1-1. The driving circuit 214 controls the switch elements T of the pixels PIX via a plurality of drive lines Vg disposed along the row direction. The other of the two main terminals of each of switch elements T arranged in a column direction (vertical direction in the diagram), for example, the switch elements T11, T21, T31, T41, T51, and T61, is electrically connected to a first-column signal line Sig1.

While the switch elements T are conductive, the electric signals corresponding to the electric charges in the conversion elements S are output to the reading circuit 102 via the signal lines Sig. The signal lines Sig1 to Sig6 can transmit the electric signals output from the plurality of pixels PIX to the reading circuit 102 column by column in parallel.

The reading circuit 102 includes amplification circuits 206 corresponding to the respective signal lines Sig. The amplification circuits 206 amplify the electrical signals output from the pixel unit 101 in parallel. The amplification circuits 206 each include an integrating amplifier 205 for amplifying an output electrical signal, a variable amplifier 204 for amplifying the electrical signal output from the integrating amplifier 205, a sample-and-hold circuit 207 for sampling and holding the amplified electrical signal, and a buffer amplifier 209. The integrating amplifier 205 includes an operational amplifier for amplifying the electrical signal read from a pixel PIX and outputting the amplified electrical signal, an integrating capacitor, and a reset switch. The amplification ratio of the integrating amplifier 205 can be changed by changing the value of the integrating capacitor. The electrical signal output from the pixel PIX is input to an inverting input terminal of the integrating amplifier 205, a reference potential Vref from the reference power supply 103 is input to a non-inverting input terminal, and the amplified electrical signal is output from an output terminal. The integrating capacitor is located between the inverting input terminal and the output terminal of the integrating amplifier 205. The sample-and-hold circuits 207 are provided for the respective amplification circuits 206, and include a sampling switch and a sampling capacitor each. The reading circuit 102 further includes a multiplexer 208 for sequentially outputting the electrical signals read from the amplification circuits 206 in parallel as a serial image signal. An image signal that is an analog electrical signal output from the buffer amplifier 209 is converted into digital image data by an analog-to-digital (A/D) converter 210, and the digital image data is output to the control computer 120 illustrated in FIG. 1.

The power supply unit 105 (omitted in FIG. 2) transforms power from a battery or from outside into various power supplies, and supplies power to the reference power supply 103 of the amplifier circuits 206 and the bias power supply unit 104 illustrated in FIG. 2. The reference power supply 103 supplies the reference potential Vref to the non-inverting input terminals of the integrating amplifiers 205. The bias sources 203 of the bias power supply unit 104 supply a common bias potential Vs to the other of the two electrodes of each of the conversion elements S via the bias lines Bs. The bias sources 203 of the bias power supply unit 104 output current information including temporal changes in the amounts of current flowing through the bias lines Bs to the sensing unit 106. In the present exemplary embodiment, the bias sources 203 each include a current-to-voltage conversion circuit 215 as a circuit for outputting the current information. The current-to-voltage conversion circuit 215 includes an operational amplifier and a resistor. However, the configuration of the bias sources 203 is not limited thereto. For example, the bias sources 203 each may include a current-to-voltage conversion circuit using a shunt resistor. The bias sources 203 each may further include an A/D conversion circuit for converting the output voltage of the current-to-voltage conversion circuit into a digital value, and output the current information in the form of the digital value. The bias sources 203 may output appropriate physical quantities corresponding to the amounts of current supplied to (flowing through) the bias lines Bs to the sensing unit 106.

A bias power supply circuit 217 for supplying a bias potential Vs1 is connected to a non-inverting input terminal of the current-to-voltage conversion circuit 215 of a bias source 203a. A bias line Bsa is connected to an inverting input terminal of the current-to-voltage conversion circuit 215 of the bias source 203a. A bias power supply circuit 217 for supplying a bias potential Vs2 is connected to a non-inverting input terminal of the current-to-voltage conversion circuit 215 of a bias source 203b. A bias line Bsb is connected to an inverting input terminal of the current-to-voltage conversion circuit 215 of the bias source 203b.

The driving circuit 214 outputs drive signals to the respective drive lines Vg based on control signals D-CLK, OE, and DIO input from the control unit 107 illustrated in FIG. 1. The drive signals have a conducting voltage Vcom for bringing the switch elements T into a conductive (on) state or a non-conductive voltage Vss for bringing the switch elements T into a non-conductive (off) state. The driving circuit 214 thereby controls the switch elements T on and off and drives the pixel unit 101. The control signal D-CLK is a shift clock for a shift register used as the driving circuit 214. The control signal DIO is a pulse that the shift register transfers. The control signal OE is a signal for controlling the output ends of the shift register. A driving duration and a scanning direction are set by using these control signals D-CLK, DIO, and OE.

The control unit 107 also controls operation of the components of the reading circuit 102 by giving control signals RC, SH, and CLK to the reading circuit 102. The control signal RC controls the operation of the reset switches in the integrating amplifiers 205. The control signal SH controls the operation of the sample-and-hold circuits 207. The control signal CLK controls the operation of the multiplexer 208.

Figure 3:
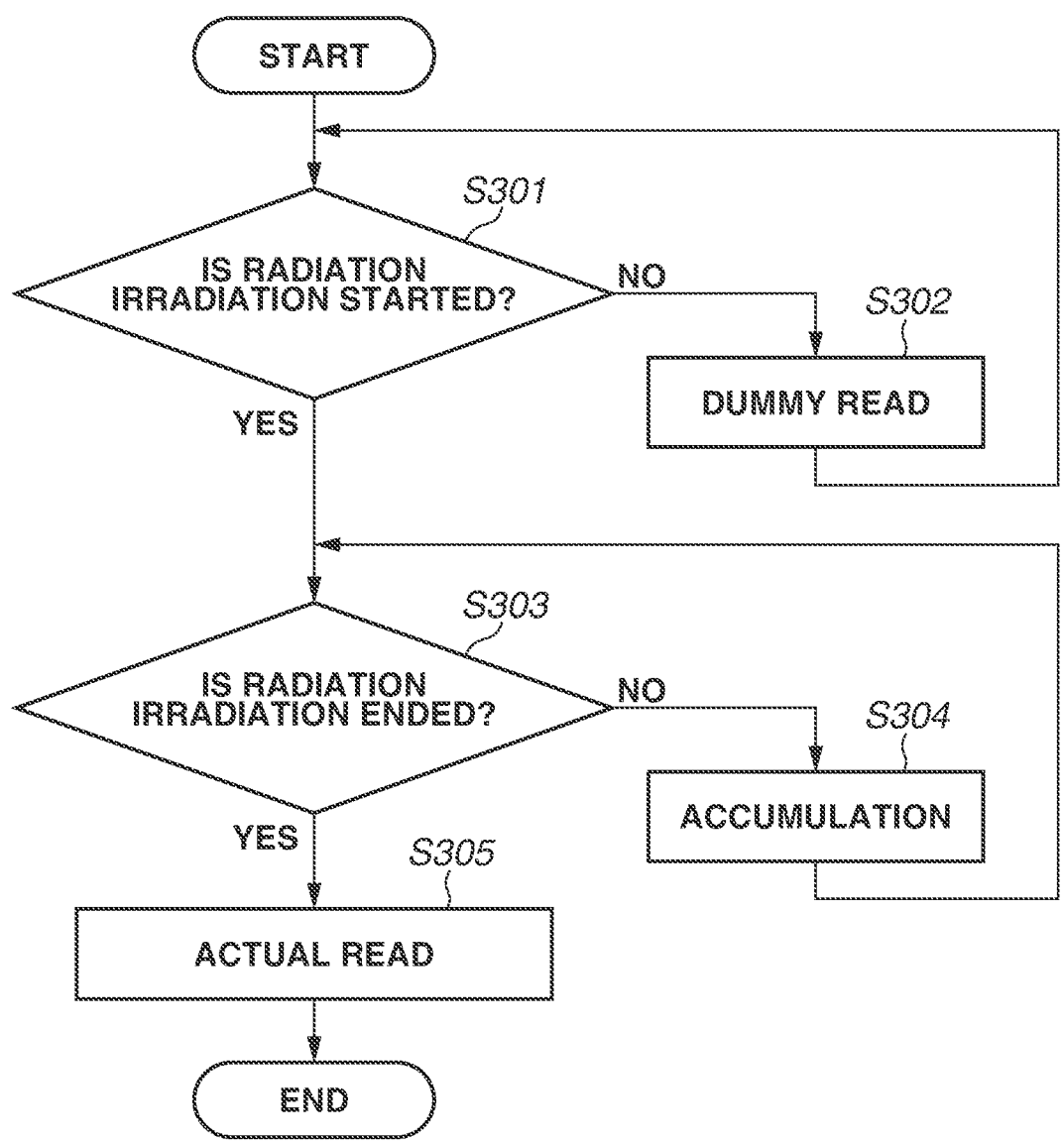
FIG. 3 is a flowchart illustrating an operation of the radiographic apparatus illustrated in FIG. 1.

FIG. 3 is a flowchart illustrating an operation example of the radiographic apparatus 100 according to the present exemplary embodiment. As described above, the components of the radiographic apparatus 100 are controlled by the control unit 107.

The user sets imaging conditions for a radiographic image, and then in step S301, the sensing unit 106 initially obtains radiation information from the information about the currents flowing through the bias lines Bs obtained from the bias sources 203, and determines whether radiation irradiation is started. The start of radiation irradiation may be determined by using a method including obtaining the amounts of electric charges accumulated in the conversion elements S of the pixels PIX from the radiation information. In such a case, radiation irradiation is determined to be started if the strength of radiation determined from the amounts of electric charges exceeds a predetermined threshold. If the sensing unit 106 determines that radiation irradiation is not started (NO in step S301), the processing proceeds to step S302. In step S302, the control unit 107 causes the driving circuit 214 to perform reset driving (hereinafter, may be referred to as a dummy read) to remove the electric charges accumulated in the conversion elements S of the pixels PIX by dark currents. A dummy read is performed from the initial row (zeroth row) to the final row ((Y−1)th row) in order, and returns to the initial row after the final row.

If the sensing unit 106 determines that radiation irradiation is started (YES in step S301), the processing proceeds to step S303. In step S303, the control unit 107 determines whether the radiation irradiation is ended. The radiation irradiation may be determined to be ended if a predetermined time has elapsed since the determination that the radiation irradiation is started. Alternatively, the control unit 107 may obtain the amounts of electric charges accumulated in the conversion elements S of the pixels PIX from the radiation information obtained by the sensing unit 106. In such a case, the radiation irradiation is determined to be ended if the strength of radiation determined from the amounts of electric charges falls below a predetermined threshold. If the radiation irradiation is determined to be not ended (NO in step S303), the processing proceeds to step S304. In step S304, the driving circuit 214 turns off the switch elements T of the pixels PIX for the sake of obtaining a radiographic image. Driving for accumulating signals converted from the radiation (hereinafter, may be referred to as accumulation) is thereby performed. If the radiation irradiation is determined to be ended (YES in step S303), the processing proceeds to step S305. In step S305, the driving circuit 214 and the reading circuit 102 perform driving for reading the electric charges accumulated in the conversion elements S of the pixels PIX (hereinafter, may be referred to as an actual read). The actual read can be performed from the initial row to the final row of the pixels PIX arranged in the pixel unit 101 in order. The series of imaging operations ends when the final row is actually read.

Figure 4:
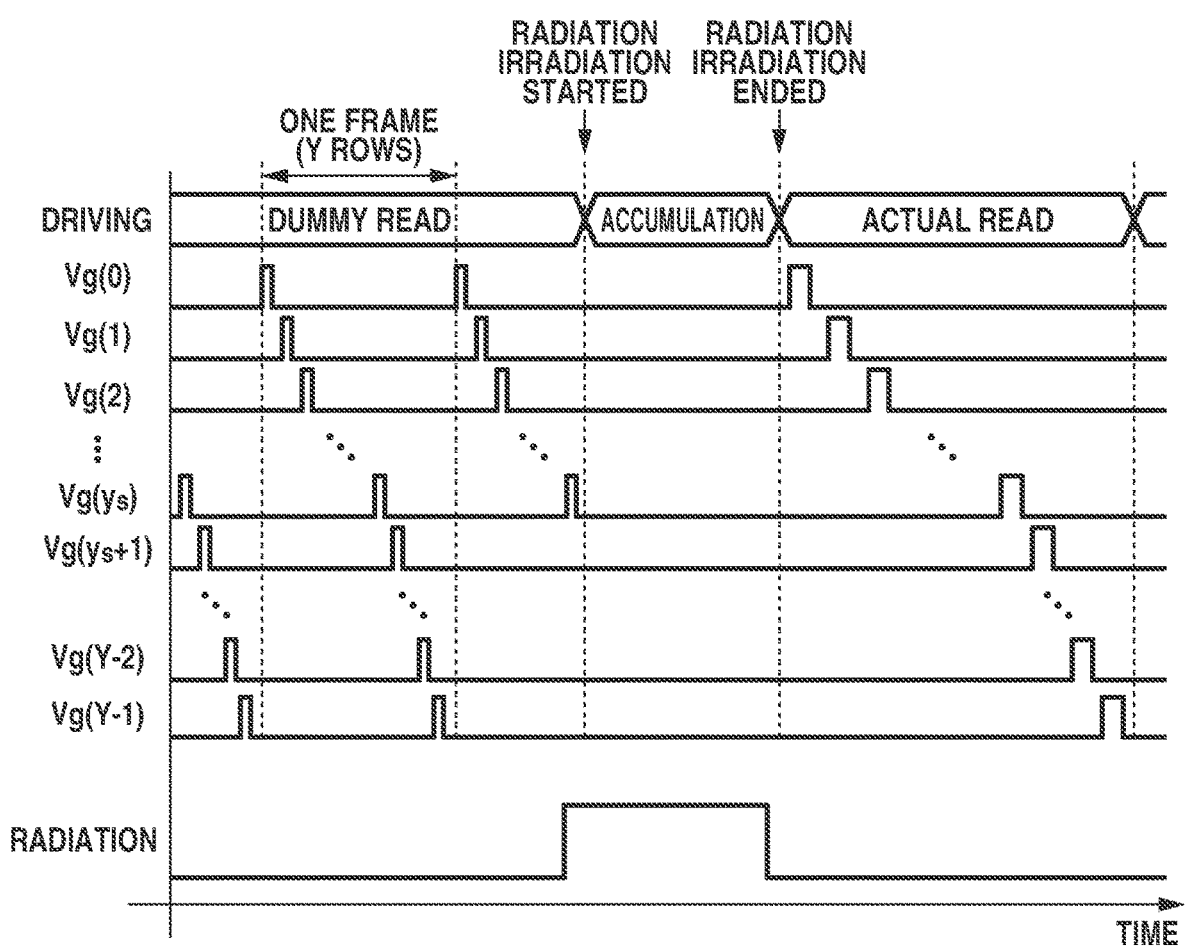
FIG. 4 is a schematic diagram illustrating driving timing of the radiographic apparatus illustrated in FIG. 1.

FIG. 4 is a schematic diagram illustrating driving timing of the radiographic apparatus 100. The control unit 107 causes the driving circuit 214 to repeat driving (dummy read) to make the switch elements S conductive from the initial row (zeroth row) to the final row ((Y−1)th row) of the pixel unit 101 in order until radiation irradiation is started. If the dummy read reaches the final row before radiation irradiation is started, the driving circuit 214 repeats the dummy read from the initial row.

If the sensing unit 106 senses (determines) the start of radiation irradiation, the control unit 107 transitions to the driving (accumulation) to turn off the switch elements T in all the rows of pixels PIX via the driving circuit 214 for the sake of obtaining a radiographic image. Details of the determination of the presence or absence of radiation irradiation will be described below. The accumulation continues until the radiation irradiation is determined to be ended. If the radiation irradiation is ended, the control unit 107 controls the driving circuit 214 and the reading circuit 102 to sequentially make the switch elements T conductive from the initial row to the final row and perform an actual read for reading the signals from the pixels PIX.

Figure 5A:
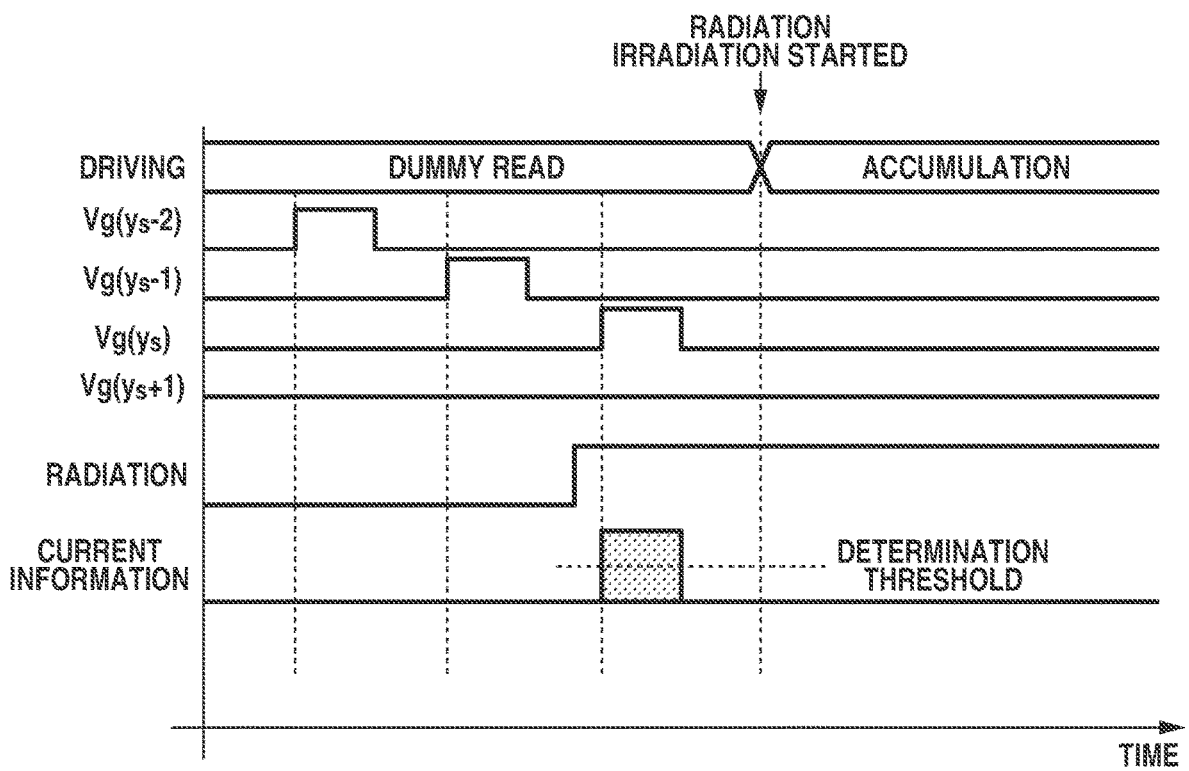
FIGS. 5A and 5B are schematic diagrams illustrating driving timing when the radiographic apparatus illustrated in FIG. 1 detects radiation.
Figure 5B:
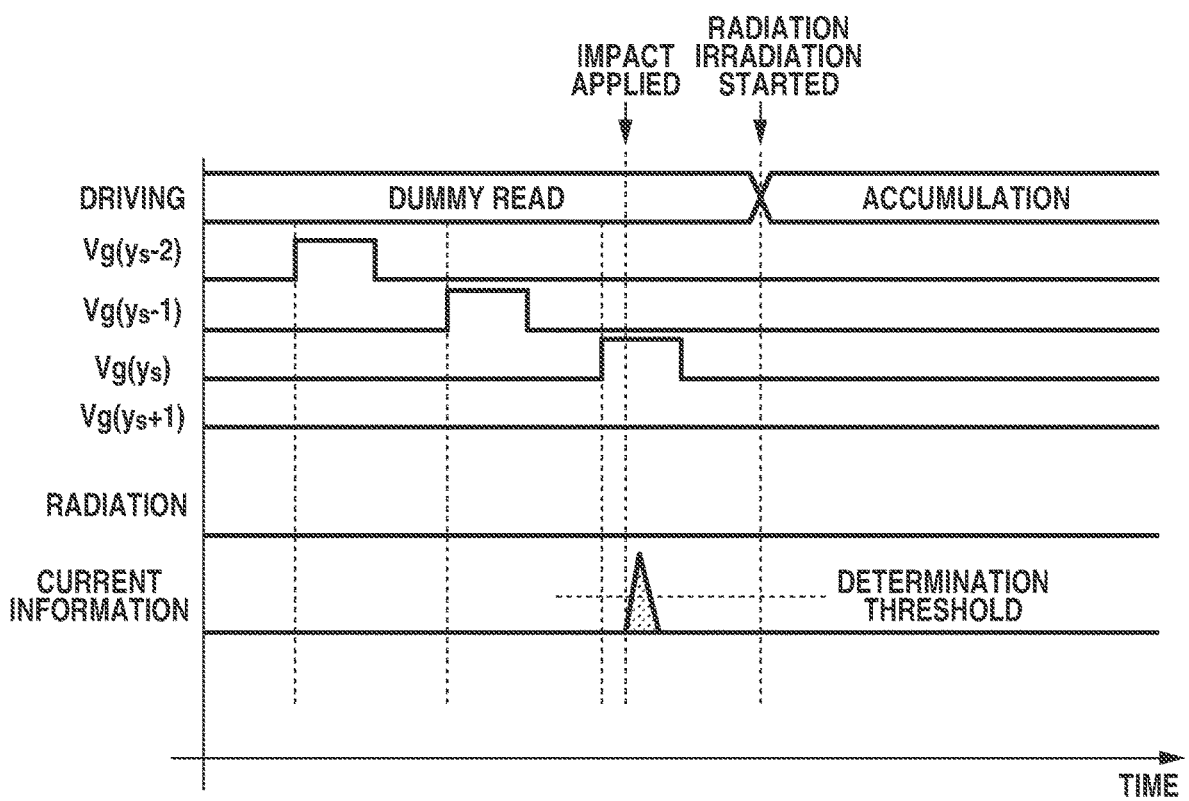

FIG. 5A illustrates the driving timing when a start of radiation irradiation of the radiographic apparatus 100 is sensed according to the present exemplary embodiment. As a comparative example, FIG. 5B illustrates driving timing in a case where a malfunction occurs due to an impact. Here, the row of the radiographic apparatus 100 where radiation irradiation is determined to be started will be referred to as row $y_s$.

FIG. 5A is an enlarged chart illustrating the vicinity of row $y_s$ where the radiation irradiation is determined to be started, illustrated in FIG. 4. FIG. 5A illustrates current information for the sensing unit 106 to output radiation information including temporal changes in the strength of radiation incident on the pixel unit 101, which is output from the bias sources 203. The sensing unit 106 obtains the radiation information from the information about the currents flowing through the bias lines Bs obtained from the bias sources 203, and determines whether radiation irradiation is started. In FIG. 5A, radiation irradiation is started between scanning of row $y_{s-1}$ and that of row $y_s$. During scanning of row $y_s$, the information about the current flowing through the bias line Bs exceeds a determination threshold, and the sensing unit 106 determines that radiation irradiation is started. Based on this determination result, the control unit 107 causes the pixel unit 101 to transition to an accumulation operation for obtaining a radiographic image.

FIG. 5B is an enlarged chart illustrating the vicinity of row $y_s$ in FIG. 4 in the case where the radiographic apparatus according to the comparative example undergoes an impact during a dummy read of row $y_s$. In general, there is a demand for light-weighted radiographic apparatuses to improve portability and usability. For example, lightweight materials such as carbon tend to be selected for the casings of radiographic apparatuses instead of conventional metals. This however reduces the rigidity of the casings, and facilitates the transmission of impact and pressure to the circuit substrates inside. Similarly, the circuit substrates are being reduced in size and increased in density. For example, small-sized large-capacity ceramic capacitors tend to be employed, and a plurality of circuits tends to be integrated on a small number of substrates. If an impact or pressure acts on such circuit substrates, the ceramic capacitors can thus piezoelectrically cause voltage noise, and the noise can propagate to various circuits by interference between the circuits and easily cause malfunction. In other words, the circuits of the radiographic apparatuses can be more susceptible to impact and pressure. In the example illustrated in FIG. 5B, if the radiographic apparatus undergoes an impact while scanning row $y_s$ for a dummy read and the information about the current flowing through the bias line Bs exceeds the determination threshold, the sensing unit 106 erroneously determines that radiation irradiation is started. The control unit 107 causes the pixel unit 101 to transition to the accumulation operation based on the determination.

Next, a detailed operation for the sensing unit 106 according to the present exemplary embodiment to determine a start of radiation irradiation will be described with reference to FIG. 6. In the present exemplary embodiment, the radiographic apparatus 100 can have the following characteristics as to the bias currents flowing through the bias lines Bs:

(1) During radiation irradiation, a current proportional to the amount of radiation irradiated per unit time flows through the bias lines Bs. In FIG. 6, this current is illustrated as a "first signal". This current can be higher when the switch elements T of the pixels PIX are on (conductive) than when the switch elements T are off (non-conductive). In the diagram, however, the current is illustrated to be constant for the sake of simplicity.

(2) If the switch elements T of the pixels PIX irradiated with radiation are made conductive, a current proportional to the amounts of electric charges accumulated in the conversion elements S of the pixels PIX until the conduction of the switch elements T flows through the bias lines Bs. In FIG. 6, this current is illustrated as a "second signal".

(3) A current flows through the bias lines Bs when the switch elements T of the pixels PIX are switched on or off. This current can be referred to as switching noise (not illustrated).

(4) If an impact or magnetic field is applied to the radiographic apparatus 100, a current corresponding to the frequency of the applied noise flows through the bias lines Bs. This current is referred to as external noise, and illustrated as "external noise" in FIG. 6. For example, a current of 50 to 60 Hz or so can flow through the bias lines Bs due to the effect of an electromagnetic field generated from the commercial power source. If an impact is applied to the radiographic apparatus 100, a current of several Hz to several kHz can flow through the bias lines Bs.

(5) Even in the absence of a magnetic field or with no application of an impact applied to the radiographic apparatus 100, a current flows through the bias lines Bs due to electromagnetic waves caused by the radiographic apparatus 100 itself and internal noise of the sensing unit 106. This current is referred to as system noise (not illustrated).

The "bias current" in FIG. 6 is illustrated so that the first signal, the second signal, and the external noise (and switching noise and system noise) are constant over time. However, FIG. 6 only conceptually illustrates the timing when such signals and noise occur, and the signals and noise are not necessarily constant over time.

To sense radiation irradiation, or more specifically, a start of radiation irradiation, sampled values of signals resulting from the currents flowing through the bias lines Bs can be simply used as sensing signals. This, however, can lead to an erroneous determination as in FIG. 5B described above. To reduce the effect of the external noise due to an impact or a magnetic field, the sensing unit 106 of the radiographic apparatus 100 according to the present exemplary embodiment therefore calculates radiation information and senses radiation irradiation by using the following technique.

In the present exemplary embodiment, as illustrated in FIG. 2, the bias power supply unit 104 includes a plurality of bias sources 203. The pixels PIX in the pixel unit 101 constitute a plurality of pixel groups. More specifically, the pixel groups and the bias sources 203 are disposed to correspond to each other on a one-to-one basis. The plurality of bias sources 203 supplies bias potentials to the conversion elements S of the pixels PIX via the electrically independent bias lines Bs of the respective bias sources 203. In the configuration illustrated in FIG. 2, the bias source 203a supplies a bias potential to the pixel group including pixels PIXa via the bias line Bsa. The bias source 203b supplies a bias potential to the pixel group including pixels PIXb via the bias line Bsb.

The sensing unit 106 obtains radiation information based on the signals of the currents output from the bias sources 203a and 203b to flow through the bias lines Bsa and Bsb, and senses radiation irradiation. For example, the sensing unit 106 determines that the radiographic apparatus 100 is irradiated with radiation if the radiation information or an integrated value of the radiation information exceeds a predetermined threshold.

As illustrated in FIG. 6, the driving period of the driving circuit 214 will be referred to as time TI. In other words, the radiographic apparatus 100 performs a reset operation (dummy read) at intervals of time TI. The time TI includes a time TH and a time TL. The time TH refers to the time when the driving circuit 214 supplies a high-level drive signal (hereinafter, may be referred to as an on time). The time TL refers to the time where the driving circuit 214 supplies a low-level drive signal (hereinafter, may be referred to as an off time). For example, in the present exemplary embodiment, the control unit 107 controls the driving circuit 214 so that the time TH is equal to the time TL (i.e., time TH=time TL). More specifically, upon a start of a reset operation, the driving circuit 214 switches the drive signal of a drive line Vg from a low level to a high level. After a lapse of the time TH, the driving circuit 214 restores the drive signal of the drive line Vg to the low level. After a lapse of the same amount of time TL, the driving circuit 214 then starts the next reset operation. For example, the times TH and TL may be set to 16 μs (i.e., time TH=time TL=16 μs).

Moreover, as illustrated in FIG. 6, the period when the sensing unit 106 samples the currents flowing through the bias lines Bsa and Bsb from the bias sources 203a and 203b will be referred to as a time TS. In the present exemplary embodiment, the time TH is equal to the time TS, so that the sensing unit 106 samples signal values indicating the currents flowing through the bias lines Bsa and Bsb from the bias sources 203a and 203b during the period when the drive lines Vg supply the high-level drive signal to the switch elements T of the corresponding pixels PIX. In the timing chart illustrated in FIG. 6, the times TH, TL, and TS are set to TI/2 (i.e., time TH=time TL=time TS=TI/2). However, this value is not restrictive. The times TH and TL may be set to any values or ratios.

The times TH and TS are not to be the same. The time TS may be set to a shorter period than the time TH, and the sensing unit 106 may perform a plurality of sampling operations within the period of the time TH.

In the present exemplary embodiment, the bias power supply unit 104 includes the two bias sources 203a and 203b as described above. The sensing unit 106 can thus simultaneously obtain the two signals of the currents output from the bias sources 203a and 203b to flow through the bias lines Bsa and Bsb in a single time TS. Of the two pixel groups, one including pixels PIX of which the switch elements T are turned on by the driving circuit 214 is referred to as a first pixel group. The signal value indicating the current flowing through the bias line Bs connected to the first pixel group will be referred to as an effective value S. Of the two pixel groups, one including pixels PIX of which all the switch elements T are off will be referred to as a second pixel group. The signal value indicating the current flowing through the bias line Bs connected to the second pixel group will be referred to as a noise value N. The bias line Bs connected to the first pixel group will be referred to as a first bias line, and the bias line Bs connected to the second pixel group a second bias line.

As illustrated in FIG. 6, the sensing unit 106 may sample the effective value S and the noise value N at the same timing. Since the effective value S and the noise value N are obtained without a difference in time, the foregoing second signal is included only in the effective value S with the switch elements T conductive, not in both the effective value S and the noise value N. By contrast, substantially the same amount of first signal and substantially the same amount of external noise are included both in the effective value S and the noise value N regardless of the conductive states of the switch elements T. The sensing unit 106 can thus eliminate the external noise based on the effective value S and the noise value N, or more specifically, based on a difference between the effective value S and the noise value N. Only the second signal can thereby be taken out as radiation information.

In the configuration illustrated in FIG. 2, the current information output from the two bias sources 203a and 203b has analog values obtained by converting the currents flowing through the respective bias lines Bsa and Bsb into voltages. The sensing unit 106 is thus configured to convert a difference between the effective and the noise values S and N that are both analog values into a digital value, and calculate the radiation information for determining the presence or absence of radiation irradiation based on the resulting digital value. However, this is not restrictive. For example, A/D converters for A/D-converting the outputs of the current-to-voltage conversion circuits 215 in the respective bias sources 203 may be disposed between the bias sources 203 and the sensing unit 106.

In such a case, the sensing unit 106 may calculate the radiation information based on a difference between the A/D-converted digital values of the effective and noise values S and N output from the bias sources 203a and 203b.

Now, two sampled values obtained by a yth (y is an arbitrary natural number) reset operation (dummy read) will be referred to as an effective value S(y) and a noise value N(y). The radiation information for use in sensing radiation irradiation will be denoted by X(y). The sensing unit 106 may calculate the radiation information X(y) by calculation expressed by the following equation (1):

$$X(y)=S(y)-N(y) \qquad \text{Eq. (1)}$$

Eq. (1) represents subtraction processing between the current flowing through the bias line Bs connected to the pixel group including the pixels PIX of which the switch elements T are turned on (first pixel group) and the current flowing through the bias line Bs connected to the pixel group where all the switch elements T are off (second pixel group). If the pixels PIX differ from one another in output characteristics, the radiation information X(y) may be calculated using the signal values S(y) and N(y) weighted based on variations of the pixels PIX as expressed by the following equation (2):

$$X(y)=a \times S(y)-b \times N(y), \qquad \text{Eq. (2)}$$

where a and b are weighting factors.

If a start of radiation irradiation is sensed by the sensing unit 106, the control unit 107 causes all the switch elements T to be non-conductive so that the pixels PIX accumulate signals resulting from radiation. The control unit 107 then performs an actual read upon on an end of the radiation irradiation. In the configuration illustrated in FIG. 2, two drive lines for dividing pixels PIX into respective pixel groups are connected to pixels PIX arranged in each row. In the configuration illustrated in FIG. 2, the pixels PIX include the pixels PIXa and PIXb adjoining in the row direction. The pixels PIXa and PIXb belong to respective different pixel groups among the plurality of pixel groups, and connected with respective different drive lines Vg among the plurality of drive lines Vg. In the circuit diagrams discussed in Japanese Patent Application Laid-Open No. 2014-168203, there are Y drive lines Vg. In the present exemplary embodiment, there are 2Y drive lines Vg. Assuming that the driving period, or time TI, is the same as in Japanese Patent Application Laid-Open No. 2014-168203, it will take twice longer to read the signals of all the rows if an actual read is performed by making the switch elements T conductive from the initial row (zeroth row) to the final row ((Y−1)th row) in succession. As illustrated in FIG. 7, during an actual read, the control unit 107 therefore controls the driving circuit 214 to make two drive lines Vg conductive at a time to prevent the actual read time from increasing due to the increase of the drive lines Vg. Specifically, as illustrated in FIG. 2, among the plurality of pixels PIX, ones arranged in each column share the same signal line Sig. In obtaining radiographic image data, the driving circuit 214 can thus prevent an increase in the actual read time by simultaneously turning on the switch elements T of the pixels PIXa and PIXb.

In the present exemplary embodiment, the effective value S and the noise value N are sampled at the same timing because of the provision of the two bias sources 203. A radiographic apparatus 100 and a radiographic system SYS that have a high robustness against noise generated by application of pressure or impact to the casing and can obtain high-quality image information can thus be provided without a need for a synchronization signal with the radiation generation apparatus 130.

In the present exemplary embodiment, the radiographic apparatus 100 is described to include two bias sources 203. However, the radiographic apparatus 100 may include three or more bias sources 203. In such a case, the effective value S and the noise value N can be sampled as appropriate from the currents flowing through the three or more bias lines Bs. While in the configuration illustrated in FIG. 2 the pixels PIX belonging to the two pixel groups are alternately arranged in the row direction and ones adjoining in the column direction are included in the same one of the two pixel groups, this is not restrictive. The pixels PIX belonging to the respective pixel groups may be arranged in any appropriate order.

In the present exemplary embodiment, as illustrated in FIG. 6, the effective value S and the noise value N are sampled at the same timing. However, this is not restrictive. If there is only one bias source 203, the effective value S and the noise value N can be sampled only at respective different timings. Since the sensing unit 106 obtains the effective value S and the sample value N so that the sampling timings thereof overlap at least in part, the effect of external noise can be reduced compared to the case where there is only one bias source 203.

A difference between the numbers of pixels PIX included in the respective pixel groups may be 10% or less. The numbers of pixels PIX included in the respective pixel groups may be the same, for example. Including the same numbers of pixels PIX in the pixel groups can uniformize the amounts of external noise, switching noise, and system noise flowing through the bias lines Bs to reduce the effect of noise when the sensing unit 106 senses the presence or absence of radiation irradiation.

The time constants of the bias lines Bsa and Bsb can have significant effects on the calculation accuracy of the radiation information and the image quality. One of the effects is crosstalk. The crosstalk is caused by a signal read from one pixel being affected by a signal of another pixel read at different timing. A potential variation can occur in the signal of one pixel via the parasitic capacitances of the bias lines Bs in reading the signal of the other pixel, and such a variation may fail to be recovered before the reading of the one pixel. The degree of the recovery failure can be superposed on the signal that is supposed to be read. The possible amount of superposition depends on the time constants of the bias lines Bs. If the bias lines Bsa and Bsb have significantly different time constants, the possible amount of crosstalk can differ greatly and the image quality of the obtained radiographic image can be affected. Another effect is on the current information including temporal changes in the amounts of currents flowing through the bias lines Bs. If the bias lines Bsa and Bsb have significantly different time constants, the amounts of currents flowing through the bias lines Bs can differ greatly and the obtained current information can be affected. This can affect the accuracy of determination of a start of radiation irradiation.

The bias lines Bsa and Bsb, or the first and second bias lines, therefore desirably have substantially the same time constants. A schematic configuration as a configuration example of the detection unit 110 of the radiographic apparatus 100 will be described with reference to FIG. 8. As illustrated in FIG. 8, the pixels PIXa and PIXb, the drive lines Vg, the signal lines Sig, and the bias lines Bs constituting the pixel unit 101 are disposed on an insulating substrate 803. Meanwhile, an integrated circuit (IC) constituting the reading circuit 102 and an IC constituting the bias power supply unit 104 are disposed on a printed circuit board 801. The reading circuit 102 is electrically connected to the signal lines Sig on the insulating substrate 803 via flexible circuit boards 802. The bias power supply unit 104 is electrically connected to the bias lines Bs on the insulating substrate 803 via the flexible circuit boards 802. Now, focus attention on one of the flexible circuit boards 802. As illustrated in FIG. 8, the bias lines Bsa and Bsb constitute a pair of sets. One of the sets is located at one end of the wiring group of signal lines Sig connected to the flexible circuit board 802. The other set is located at the other end. Alternatively, as illustrated in FIG. 9, the bias line Bsa may be located at one end of the wiring group of signal lines Sig, and the bias line Bsb at the other end. However, in the layout illustrated in FIG. 9, the wiring lengths of the bias lines Bsa and Bsb from the flexible circuit board 802 to the pixels PIX can vary, and the wiring resistances and capacitance thus can vary. The layout illustrated in FIG. 8 facilitates uniformizing the lengths of the bias lines Bsa and Bsb connected to the flexible circuit board 802 from the pixels PIX compared to the layout illustrated in FIG. 9. This can reduce a difference between the time constants of the bias lines Bsa and Bsb.

Next, a configuration example of the bias lines Bsa and Bsb illustrated in FIG. 8 will be described with reference to FIG. 10. The bias line Bsa includes a plurality of individual wiring portions 1006, a lead wiring portion 1003, and connection wiring portions 1001. The individual wiring portions 1006 are wiring portions for connecting to the conversion elements S of the plurality of pixels PIXa arranged in the column direction in the first pixel group. The lead wiring portion 1003 is a wiring portion for electrically connecting the plurality of individual wiring portions 1006. The connection wiring portions 1001 are wiring portions connecting the lead wiring portion 1003 to the flexible circuit boards 802. The bias line Bsb includes a plurality of individual wiring portions 1007, a lead wiring portion 1004, and connection wiring portions 1002. The individual wiring portions 1007 are wiring portions for connecting to the conversion elements S of the plurality of pixels PIXb arranged in the column direction in the second pixel group. The lead wiring portion 1004 is a wiring portion for electrically connecting the plurality of individual wiring portions 1007. The connection wiring portions 1002 are wiring portions for connecting the lead wiring portion 1004 to the flexible circuit boards 802.

Next, a sectional structure of the bias lines Bs illustrated in FIG. 10 will be described with reference to FIGS. 11A and 11B. FIG. 11A is a sectional view taken along the line A-A' of FIG. 10. FIG. 11B is a sectional view taken along the line B-B' of FIG. 10. Each bias line includes a first wiring layer 1118, a second wiring layer 1115, and a third wiring layer 1112. The first wiring layer 1118 is a wiring layer that can constitute drive lines Vg and extends in the row direction. The second wiring layer 1115 is wiring layer that can constitute signal lines Sig and extends in the column direction. The third wiring layer 1112 is a wiring layer that can constitute the connection wiring portions 1001, the connection wiring portions 1002, the lead wiring portion 1003, the lead wiring portion 1004, the individual wiring portions 1006, and the individual wiring portions 1007. The second wiring layer 1115 can be located on the first wiring layer 1118 with an insulating layer 1117 and an insulating layer 1116 therebetween. The third wiring layer 1112 can be located on the second wiring layer 1115 with an insulating layer 1114 and an insulating layer 1113 therebetween. The third wiring layer 1112 can be covered with and insulated and protected by an insulating layer 1111 except where the third wiring layer 1112 is connected to the flexible circuit boards 802. The first, second, and third wiring layers 1118, 1115, and 1112 can be electrically connected by contact holes 1005 illustrated in FIG. 10.

As illustrated in FIGS. 10, 11A, and 11B, the corresponding layers of the bias lines Bsa and Bsb have the same widths, thicknesses, and lengths. The numbers of contact holes in the bias lines Bsa and Bsb are also the same. This can make the time constants of the bias lines Bsa and Bsb substantially the same. In particular, the layers of the lead wiring portion 1003 of the bias line Bsa and those of the lead wiring portion 1004 of the bias line Bsb desirably have the same widths, thicknesses, and lengths, and have the same numbers of contact holes. Moreover, the layers of the connection wiring portions 1001 of the bias line Bsa and those of the connection wiring portions 1002 of the bias line Bsb desirably have the same widths, thicknesses, and lengths, and have the same numbers of contact holes. In other words, the lead wiring portion 1003 and the connection wiring portions 1001 of the bias line Bsa desirably have substantially the same resistances and capacitances as those of the lead wiring portion 1004 and the connection wiring portions 1002 of the bias line Bsb.

Next, the range of being substantially the same will be described. An image artifact resulting from a crosstalk has a size proportional to the ratio of a difference $\Delta\tau$ between the time constants of the bias lines Bsa and Bsb to a time constant $\tau$ related to the pixel PIX. The time constant ti related to the pixel PIX is expressed by the following equation (3):

$$\tau = \tau_{ON} + \tau_{sig} + \tau_{bs}, \quad \text{Eq. (3)}$$

where $\tau_{ON}$ is the time constant of the switch element T of the pixel PIX when the switch element T is on, $\tau_{sig}$ is the time constant of the signal line Sig, and $\tau_{bs}$ is the time constant of the bias line Bs.

Assuming that the time constants $\tau_{sig}$ of the signal lines Sig in the pixel unit 101 are the same and the time constants $\tau_{ON}$ of the switch elements T when the switch elements T are on are the same within the pixel unit 101, the difference $\Delta T$ between the time constants is expressed by the following equation (4):

$$\Delta\tau = |\tau_{bsa} - \tau_{bsb}|. \quad \text{Eq. (4)}$$

The ratio of the difference $\Delta T$ between the time constants to the time constant ti is expressed by the following equation (5):

$$\Delta\tau/\tau = |(R_{bsa} \cdot C_{bsa} - R_{bsb} \cdot C_{bsb})|/C_S \cdot R_{ON}, \quad \text{Eq. (5)}$$

where $R_{bsa}$ is the resistance of the bias line Bsa, $C_{bsa}$ is the capacitance of the bias line Bsa, $R_{bsb}$ is the resistance of the bias line Bsb, $C_{bsb}$ is the capacitance of the bias line Bsb, $C_S$ is the capacitance of the conversion element S in each pixel PIX, and $R_{ON}$ is the resistance of the switch element T when the switch element T is ON.

It has been verified that a crosstalk-related artifact in the radiographic image would not be a problem in radiographic diagnosis if $\Delta\tau/\tau$ expressed by Eq. (5) is 0.1% or less. The range where the $\Delta\tau/\tau$ is 0.1% or less is thus the range of being substantially the same according to the present exemplary embodiment.

Figure 12:
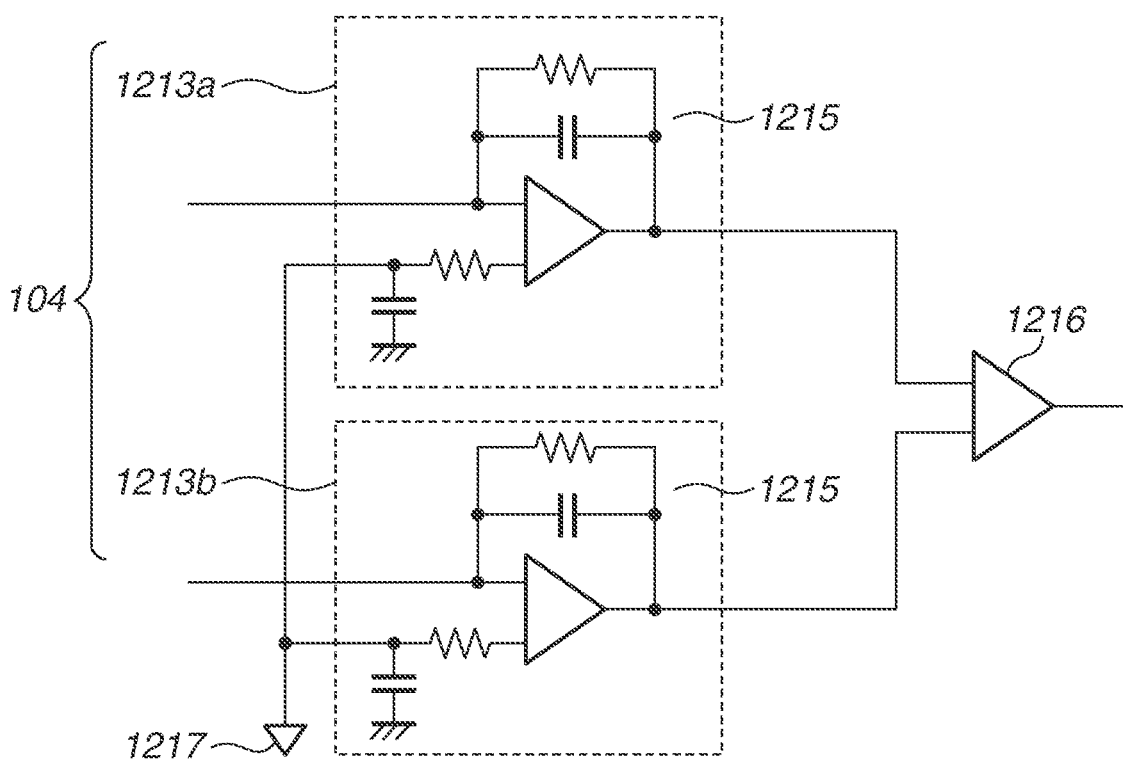
FIG. 12 is a diagram illustrating a modification of the configuration of bias sources illustrated in FIG. 2.

While the bias sources 203 each include a current-to-voltage conversion circuit 215 including an operational amplifier and a resistor as a circuit for outputting current information illustrated in FIG. 2, this configuration is not restrictive. For example, as illustrated in FIG. 12, a common bias power supply circuit 1217 may be connected to the non-inverting input terminal of a current-to-voltage conversion circuit 1215 of a bias source 12131203a and the non-inverting input terminal of a current-to-voltage conversion circuit 1215 of a bias source 1213b. This makes the noise components that can get in from the bias power supply circuit 1217 common between the two systems. The determination accuracy can thus be improved since the common noise components can be reduced by the subtraction processing. The output terminals of the current-to-voltage conversion circuits 1215 may be input to a differential amplifier 1216 so that the circuit for outputting the current information outputs a difference between the analog signals.

Figure 13:
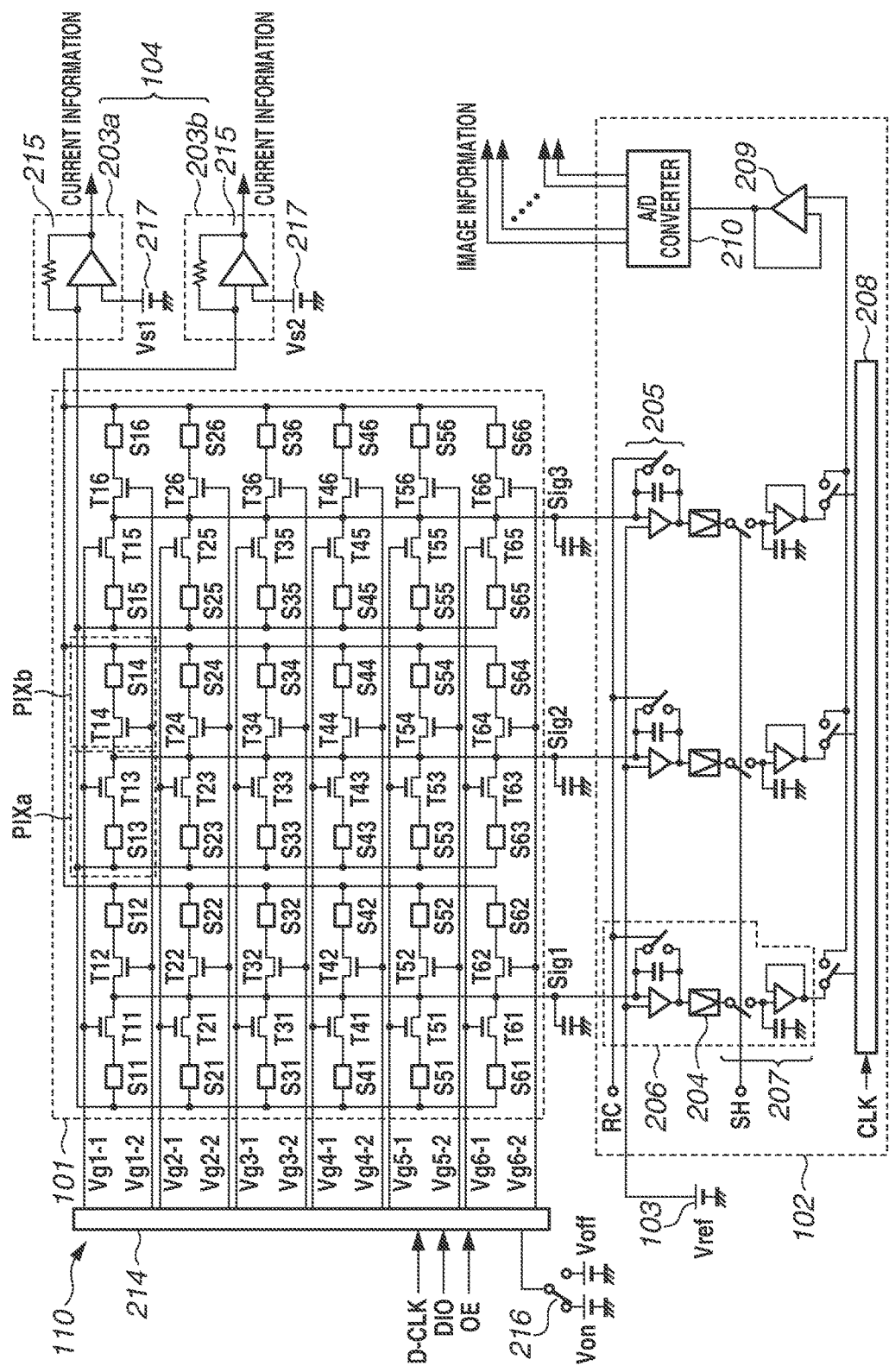
FIG. 13 is a diagram illustrating a modification of the configuration of the radiographic apparatus illustrated in FIG. 2.

Next, a modification of the configuration example of the detection unit 110 of the radiographic apparatus 100 illustrated in FIG. 2 will be described with reference to FIG. 13. FIG. 13 is an equivalent circuit diagram illustrating the modification of the configuration example of the detection unit 110 of the radiographic apparatus 100. The configuration of the detection unit 110 illustrated in FIG. 13 is different from that illustrated in FIG. 2 in the configuration of the pixel unit 101 and the configuration of the amplification circuits 206 in the reading circuit 102. Specifically, pixels PIXa and PIXb that are included in respective different pixel groups, are connected to respective different drive lines Vg, and adjoin in a row direction share signal lines Sig. The number of signal lines Sig is thus reduced by half compared to the configuration of FIG. 2. The number of amplification circuits 206 included in the reading circuit 102 is also reduced by half accordingly compared to the configuration illustrated in FIG. 2. As a result, while the configuration illustrated in FIG. 13 includes the driving circuit 214 of increased scale compared to the configuration discussed in Japanese Patent Application Laid-Open No. 2014-168203, the amplification circuits 206 in the reading circuit 102 can be reduced. This can suppress an increase in cost due to an increase in the number of ICs in the entire radiographic apparatus 100 including the driving circuit 214 and the reading circuit 102, and reduce the wiring inside the pixel unit 101.

The pixels PIXa and PIXb are connected to the different bias sources 203 via the electrically independent bias lines Bs. As described above with reference to FIG. 6, in sensing the presence or absence of radiation irradiation, the effective value S and the noise value N can thus be sampled at the same timing. Moreover, like the configuration illustrated in FIG. 2 described above, the pixels PIX for obtaining the effective value S and the noise value N are arranged to adjoin each other. Even if a local impact is applied to the casing of the radiographic apparatus 100 as noise, the same noise can be deemed to be applied to the pitches of the pixels PIX at the same timing. The configuration illustrated in FIG. 13 can thus reduce noise and more accurately sense a start of radiation irradiation by the operation described with reference to FIG. 6.

Figure 14:
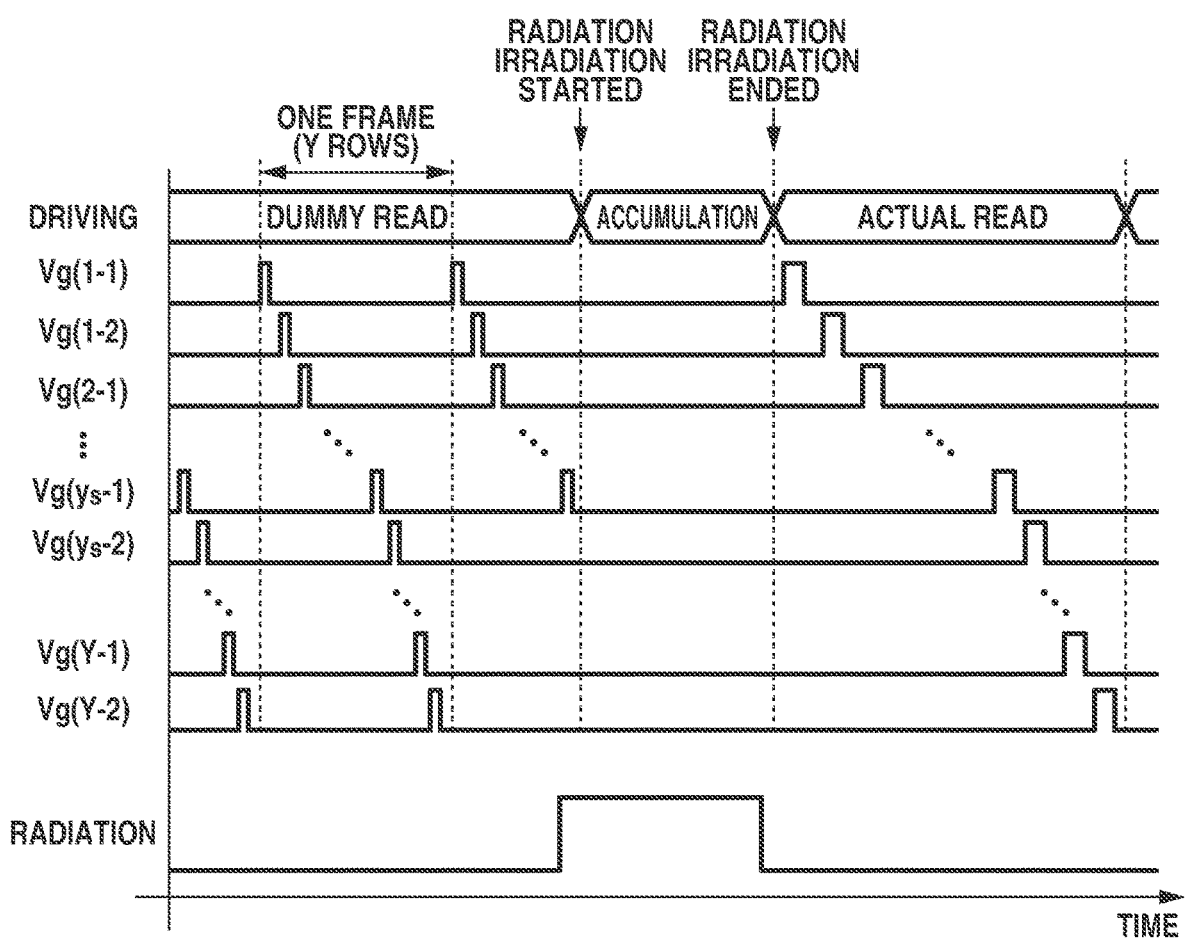
FIG. 14 is a schematic diagram illustrating driving timing when the radiographic apparatus illustrated in FIG. 13 detects radiation.

FIG. 14 is a schematic diagram illustrating the driving timing of the detection unit 110 illustrated in FIG. 13. The driving for sensing the presence or absence of radiation irradiation during a dummy read is similar to that described with reference to FIG. 6. A description thereof will thus be omitted. In the present exemplary embodiment, adjoining pixels PIXa and PIXb are connected to the same signal lines Sig. During an actual read, the switch elements T in two rows are therefore unable to be turned on together because the signals read from two pixels are added to each other. In obtaining radiographic image data, the driving circuit 214 therefore turns on the switch elements T of pixels PIX connected to the same signal lines Sig at different timings as illustrated in FIG. 14. The electric charges accumulated in the respective pixels PIX can thereby be read out.

In the present modification, the effective value S and the noise value N are sampled at the same timing because of the provision of two bias sources 203. A radiographic apparatus 100 and a radiographic system SYS that have a high robustness against noise generated by application of pressure or impact to the casing and can obtain high-quality image information can thus be provided without a need for a synchronization signal with the radiation generation apparatus 130. Moreover, the number of amplification circuits 206 in the reading circuit 102 can be reduced by sharing the signal lines Sig for outputting signals between the pixels PIX adjoining in the row direction. This can offset the increase in cost due to the increased circuit scale of the driving circuit 214.

Next, a method for preventing a drop in the dummy read framerate due to an increase in the number of drive lines Vg will be described with reference to FIG. 15. As described above with reference to FIG. 3, the driving period TI of the driving circuit 214 includes two periods, i.e., the on time (time TH) and the off time (time TL). The plurality of drive lines Vg includes first drive lines (for example, drive line Vg1-1) and second drive lines (for example, drive line Vg1-2) different from the first drive lines. In determining the presence or absence of radiation irradiation, the driving circuit 214 turns the switch elements T connected to the drive line Vg1-1 from on to off, and after a lapse of predetermined time, turns the switch elements T connected to the drive line Vg1-2 on.

By contrast, the detection unit 110 of the radiographic apparatus 100 according to the present modification includes a plurality (in this modification, two systems) of bias sources 203, and can thus simultaneously sample the effective value S and the noise value N during the time TH. In other words, in the configuration of this modification, the off time (time TL) is not necessarily needed. In determining the presence or absence of radiation irradiation, the driving circuit 214 therefore controls timing so that the timing when the switch elements T connected to the drive line Vg1-1 are turned from on to off overlaps the timing when the switch elements T connected to the drive line Vg1-2 are turned from off to on.

It is commonly known that a current flows through the bias lines Bs when the switch elements T are turned on or off. Such a current is referred to as switching noise. As illustrated in FIG. 15, switching noise can be cancelled out by synchronizing a fall of the drive signal for the switch elements T in one pixel row with a rise of the drive signal for the switch elements T in the next pixel row. In other words, the driving of the detection unit 110 illustrated in FIG. 15 is effective in a case where the switching noise of the switch elements T is high.

Figure 15:
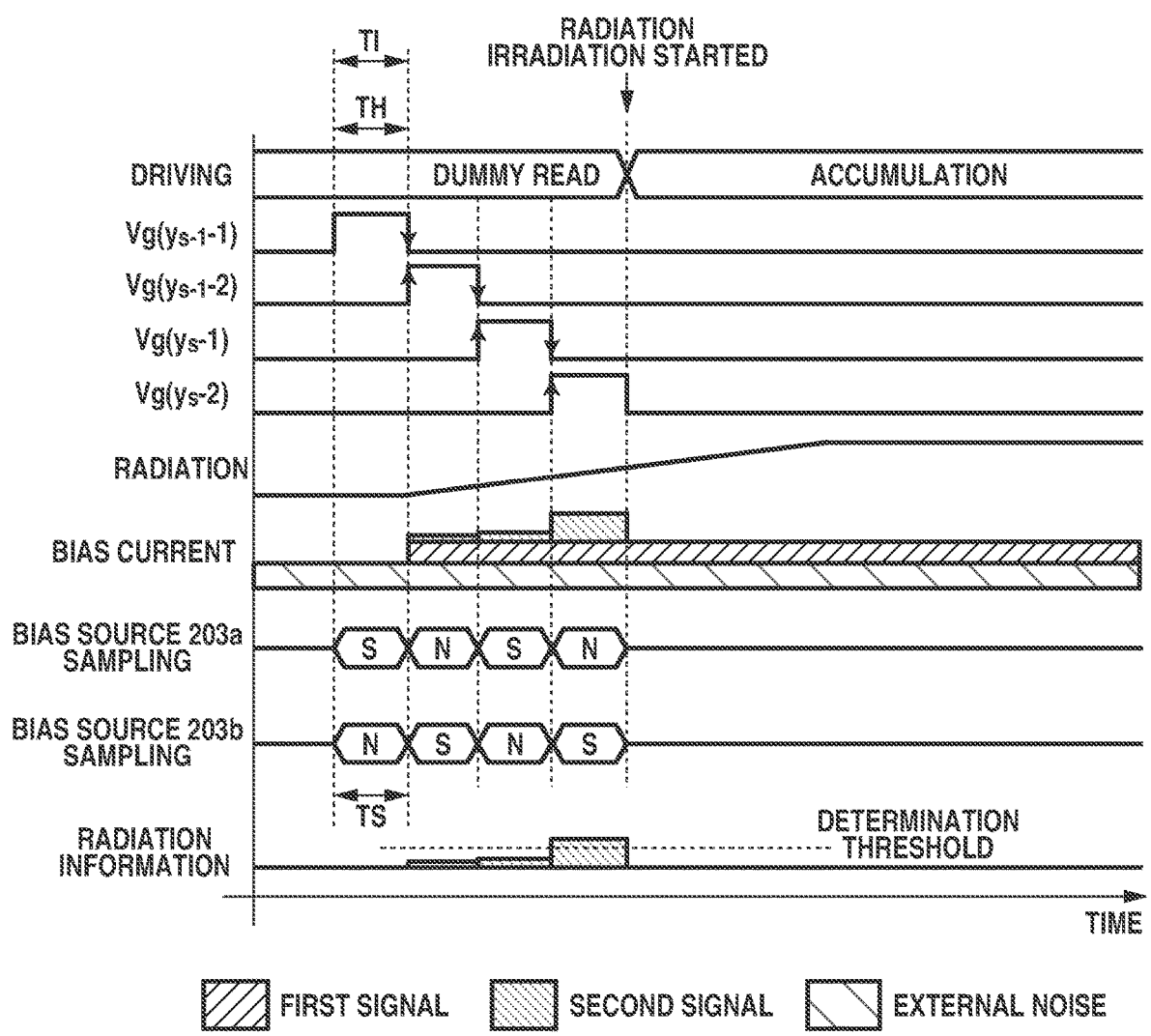
FIG. 15 is a diagram illustrating a modification of the driving timing illustrated in detail in FIG. 6.

Moreover, the driving illustrated in FIG. 15 does not need the off time (time TL) during a dummy read, and can reduce the driving period per row by setting the time TI=the time TH. The configuration of the radiographic apparatus 100 according to the present modification increases the drive lines Vg compared to the configuration discussed in Japanese Patent Application Laid-Open No. 2014-168203. However, the provision of the plurality of bias sources 203 can reduce the time TI that is the driving period during a dummy read, and thus the time for reading one frame row by row can be maintained.

Even by the driving illustrated in FIG. 15, the effective value S and the noise value N are sampled at the same timing because of the provision of the two bias sources 203. A radiographic apparatus 100 and a radiographic system SYS that have a high robustness against noise generated by application of pressure or impact to the casing and can obtain high-quality image information can thus be provided without a need for a synchronization signal with the radiation generation apparatus 130. Moreover, the switching noise due to the turning on and off of the switch elements T during a dummy read can be reduced as described above, and the accuracy of the determination of a start of radiation irradiation can be improved. Furthermore, the omission of the time TL during a dummy read can improve the sampling rate to obtain the currents flowing through the bias lines Bs for determining the presence or absence of radiation irradiation. The time resolution as to the determination of the presence or absence of radiation irradiation is thereby improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited to the foregoing exemplary embodiments, and various modifications and changes may be made without departing from the spirit and scope of the invention. The claims are therefore appended to make the scope of the invention public.

A technique advantageous in sensing the presence or absence of radiation irradiation with higher accuracy is provided by the means described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-080611, filed May 11, 2021, which is hereby incorporated by reference herein in its entirety.

What is claimed is:

1. A radiographic apparatus comprising:
a plurality of pixel groups and a plurality of bias sources, wherein the pixel groups and the bias sources are arranged to correspond to each other on a one-to-one basis;
a driving circuit; and
a sensing unit,
wherein each of the plurality of pixel groups includes a pixel including a conversion element configured to convert radiation into a charge and a switch element configured to connect the conversion element to a signal line,
wherein each of the plurality of bias sources is configured to supply a bias potential to the conversion element of the pixel in the corresponding pixel group via at least one of a plurality of electrically independent bias lines,
wherein the driving circuit is configured to control the switch elements of the pixels, and
wherein the sensing unit is configured to sample a first signal value and a second signal value at timings overlapping at least in part, the first signal value indicating a current flowing through a first bias line among the plurality of bias lines, the first bias line being connected to a first pixel group including a pixel of which the switch element is turned on by the driving circuit among the plurality of pixel groups, the second signal value indicating a current flowing through a second bias line among the plurality of bias lines, the second bias line being connected to a second pixel group where the switch element is off among the plurality of pixel groups,
wherein the sensing unit is further configured to determine presence or absence of radiation irradiation based on the first signal value and the second signal value, and
wherein the first and second bias lines have substantially same time constants.

2. The radiographic apparatus according to claim 1, wherein the sensing unit is configured to sample the first and second signal values at same timing.

3. The radiographic apparatus according to claim 1, wherein a pixel unit where the plurality of pixel groups is disposed includes a plurality of pixels arranged in a matrix,
wherein a plurality of drive lines for the driving circuit to control the switch elements is disposed along a row direction,
wherein the plurality of pixels includes a first pixel and a second pixel adjoining in the row direction, and
wherein the first and second pixels are included in respective different pixel groups among the plurality of pixel groups and connected to respective different drive lines among the plurality of drive lines.

4. The radiographic apparatus according to claim 3, wherein the signal line is shared by pixels disposed in each column among the plurality of pixels, and
wherein the driving circuit is configured to, in obtaining radiographic image data, simultaneously turn on the switch elements of the first and second pixels.

5. The radiographic apparatus according to claim 4, wherein the driving circuit is configured to, in obtaining radiographic image data, turn on the switch elements of pixels connected to a same signal line among the plurality of pixels at different timings.

6. The radiographic apparatus according to claim 3, wherein the first and second pixels share the signal line.

7. The radiographic apparatus according to claim 3, wherein pixels adjoining in a column direction among the plurality of pixels are included in a same pixel group among the plurality of pixel groups.

8. The radiographic apparatus according to claim 3,
wherein the plurality of drive lines includes a first drive line and a second drive line different from the first drive line, and
wherein the driving circuit is configured to, in determining the presence or absence of the radiation irradiation, perform control such that timing when the switch element connected to the first drive line is turned from on to off overlaps timing when the switch element connected to the second drive line is turned from off to on.

9. The radiographic apparatus according to claim 3,
wherein the plurality of drive lines includes a first drive line and a second drive line different from the first drive line, and
wherein the driving circuit is configured to, in determining the presence or absence of the radiation irradiation, turn the switch element connected to the first drive line from on to off, and after a lapse of a predetermined time therefrom, turn the switch element connected to the second drive line on.

10. The radiographic apparatus according to claim 9, wherein the pixel including the switch element connected to the first drive line and the pixel including the switch element connected to the second drive line are included in respective different pixel groups among the plurality of pixel groups.

11. The radiographic apparatus according to claim 1, wherein the plurality of pixel groups corresponds to two pixel groups.

12. The radiographic apparatus according to claim 1, wherein the sensing unit is configured to determine the presence or absence of the radiation irradiation based on a difference between the first and second signal values.

13. The radiographic apparatus according to claim 12,
wherein the first and second signal values are an analog value each, and
wherein the sensing unit is configured to determine the presence or absence of the radiation irradiation based on a digital value obtained by performing analog-to-digital conversion on a difference between the analog values that are the first and second signal values.

14. The radiographic apparatus according to claim 1, wherein a difference between numbers of pixels included in the respective pixel groups among the plurality of pixel groups is 10% or less.

15. The radiographic apparatus according to claim 1,
wherein the plurality of pixel groups, the signal line, and the plurality of bias lines are disposed on an insulating substrate,
wherein a reading circuit and the plurality of bias sources are disposed on a printed circuit board, an electrical signal based on the charge in the conversion element being output to the reading circuit via the signal line,
wherein the plurality of bias lines and a plurality of signal lines are connected to the printed circuit board via a flexible circuit board, and
wherein the first bias line and the second bias line constitute a pair of sets, one of the sets being located at one end of a wiring group of the signal lines connected to the flexible circuit board, the other set being located at the other end.

16. The radiographic apparatus according to claim 15,
wherein each of the plurality of bias lines includes an individual wiring portion, a lead wiring portion, and a connection wiring portion, the individual wiring portion being a wiring portion configured to connect to the conversion elements of a plurality of pixels arranged in a column direction in the pixel group, the lead wiring portion being a wiring portion configured to electrically connect a plurality of individual wiring portions, the connection wiring portion being a wiring portion configured to connect the lead wiring portion and the flexible circuit board, and
wherein the lead wiring portion and the connection wiring portion of the first bias line have substantially same resistances and capacitances as those of the lead wiring portion and the connection wiring portion of the second bias line.

17. The radiographic apparatus according to claim 1, wherein the first and second bias lines have substantially the same time constants if $\Delta\tau/\tau$ is 0.1% or less, $\Delta\tau/\tau$ being expressed by:

$$\Delta\tau/\tau = |(R_{bsa} \cdot C_{bsa} - R_{bsb} \cdot C_{bsb})|/C_S \cdot R_{ON},$$

where $R_{bsa}$ is a resistance of the first bias line, $C_{bsa}$ is a capacitance of the first bias line, $R_{bsb}$ is a resistance of the second bias line, $C_{bsb}$ is a capacitance of the second bias line, $C_S$ is a capacitance of the conversion element, and $R_{ON}$ is a resistance of the switch element when the switch element is on.

18. A radiographic system comprising:
the radiographic apparatus according to claim 1; and
a radiation generation apparatus configured to irradiate the radiographic apparatus with radiation.

* * * * *